(12) United States Patent　(10) Patent No.: US 6,725,370 B1
Sakakura　(45) Date of Patent: Apr. 20, 2004

(54) SHARING DATA SAFELY USING SERVICE REPLICATION

(75) Inventor: Takashi Sakakura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/353,598

(22) Filed: Jul. 15, 1999

(30) Foreign Application Priority Data

Mar. 25, 1999 (JP) .............................. 11-081049

(51) Int. Cl.⁷ ................................. H04L 9/32
(52) U.S. Cl. ....................... 713/155; 713/182; 713/185; 713/200; 713/201
(58) Field of Search ................ 713/155, 182, 713/185, 200, 201

(56) References Cited

U.S. PATENT DOCUMENTS 5,384,848 A * 1/1995 Kikuchi ...................... 380/48
5,649,185 A * 7/1997 Antognini et al. .......... 395/609
6,058,476 A * 5/2000 Matsuzaki et al. .......... 713/169

FOREIGN PATENT DOCUMENTS

JP　9251426　9/1997
JP　9270788　10/1997

OTHER PUBLICATIONS

Marjanovic, Steven, EDI Business Network to Use Northern Telecom Encryption Software Series: 22, 1996, American Banker, p. 1.*

* cited by examiner

Primary Examiner—Gilberto Barrón
Assistant Examiner—Aravind Moorthy
(74) Attorney, Agent, or Firm—Birch, Stewart, Kolasch & Birch, LLP

(57) ABSTRACT

A service replicating server replicates service per each network and shares data safely between networks such as an interoffice network and the internet. The LAN side server connected to the LAN and an internet side server connected to the internet share data at the shared disk which performs mutual exclusion using a bus having bus lock function and supplies a consistent service to each network by using the shared data.

15 Claims, 42 Drawing Sheets

| 00000000 | 00000065 | Sden7s25 | 1 | 00000000 | 00000001 |
| 1701 | 1702 | 1703 | 1704 | 1705 | 1706 |

00000000  00000065  Sden7s25  0  00000000  00000001  <DATA>
   |         |         |      |     |         |         |
  2401      2402      2403   2404  2405      2406      2407 setenckey 01010101
             /
            3401 stale    00000065    /products/sample
            4801           4802

SHARING DATA SAFELY USING SERVICE REPLICATION

BACKGROUND OF THE INVENTION

1. Field of the Invention

The present invention relates to a server for performing a data supplying service safely in a network such as internet, which is used and accessed by a third party. Particularly, the server of the present invention shares a data in the network which must be protected from accessing by the third party.

2. Background Art

Recently, the internet is becoming even more widespread. Applications such as WWW (World Wide Web) and E-mail have become a standard practice in the internet. It is now possible for the third party to use the internet to refer to various information supplied by organizations or educational institutions, as well as to use the internet for communication purposes.

When one is connected to the internet, one can have a free access to any sites on the internet as long as they are also connected to the internet. However, such conveniences do have a pitfall as laying oneself to attack by a malicious third party.

Organizations in general protect their local network systems from attacks coming via the internet by using a mechanism called firewall. The internet access possible sites within an organization's local network system are limited, and from these limited sites the internet is accessed via the firewall which only allows a specific communication to pass through. A safety of the local network system owned by the organization is more important in general than the conveniences that may be brought up by the internet connection. Most of the organizations design their local network system to have configuration which only allows an extremely limited communication such as SMTP (simple mail transfer protocol) message, which is a communication protocol of the E-mail, to pass through the firewall.

In order to reconcile the safety factor and the convenience factor of the internet connection, Japanese unexamined patent publication HEI9-270788 disclose a technique that can respond to various service requests coming from the internet, without having to change a configuration of the firewall. In this document, the communication takes place by a communication packet passing through a specific authentication port. The communication packet is storing a program that can respond to an authentication challenge of the firewall. The technique disclosed in this document guarantees the safety of the organization's local network system, at the same time, supplies a better and flexible service provided from the organization's local network to a specific user who is permitted an access to the organization's local network system.

In cases of utilizing the internet as an inexpensive communication media, a transmission data is encrypted and an encrypted transmission data is transmitted to prevent a data leakage at a communication path. An encryption and decryption of the transmission data are taking place at various levels in a system, for instance, an encryption service is taking place at a communication socket level known as SSL (secure sockets layers). Japanese unexamined patent publication HEI 9-251426 discloses an example of data encryption and decryption at an application level called file system.

In cases of connecting the organization's local network systems and the internet as described previously, the technique to use the firewall is being adopted to protect the organizations local network system. However, a problem of difficulty in enforcing a data sharing safely by the organization's local network and the internet remains.

The present invention attempts to resolve disadvantages of the conventional techniques. The aim of the present invention is to supply a data sharing mechanism to safely enforce the data sharing by the organization's local network and the internet, as well as to supply an application management apparatus and method for the applications that uses a shared data. That is, the present invention aims to supply a configuration where one can access the shared data from a local network side or from an internet side. The present invention also aims to provide a configuration where the application of local network and the application of internet both refer and update the shared data by using the application management method, so that an equivalent service is provided at both sides.

SUMMARY OF THE INVENTION

According to another aspect of the present invention, a data sharing computer system comprises a first computer system; a second computer system; a shared data storing unit; and an access control information storing unit, including:

(A) the shared data storing unit includes a plurality of data storing areas, which divides a shared data accessed by the first computer system and the second computer system, and stores the divided shared data to the plurality of data storing areas;

(B) the access control information storing unit stores an access control information which indicates whether each data storing area of the shared data storing unit is accessible or not accessible;

(C) the first computer system includes a first service unit, a first data access unit connected to the shared data storing unit, and a first mutual exclusion unit connected to the access control information storing unit; wherein (1) the first service unit instructs the first data access unit and the first mutual exclusion unit to access an arbitrary data storing area; and (2) the first mutual exclusion unit obtains the access control information of the instructed data storing area, decides whether the instructed data storing area is accessible or not accessible, and changes the access control information of the instructed data storing area to not accessible if decided as accessible;

(3) the first data access unit accesses the instructed data storing area after the first mutual exclusion unit decides that the instructed data storing area is accessible and changes the access control information to not accessible; and (4) the first mutual exclusion unit changes the access control information of the instructed data storing area to accessible after the first data access unit accesses the instructed data storing area.

(D) the second computer system includes a second service unit, a second data access unit connected to the shared data storing unit, and a second mutual exclusion unit connected to the access control information storing unit; wherein (1) the second service unit instructs the second data access unit and the second mutual exclusion unit to access an arbitrary data storing area;

(2) the second mutual exclusion unit obtains the access control information of the instructed data storing area, decides whether the instructed data storing area is accessible or not accessible, and changes the access control information of the instructed data storing area to not accessible if decided as accessible;

(3) the second data access unit accesses the instructed data storing area after the second mutual exclusion unit decides that the instructed data storing area is accessible and changes the access control information to not accessible; and (4) the second mutual exclusion unit changes the access control information of the instructed data storing area to accessible after the second data access unit accesses the instructed data storing area.

According to another aspect of the present invention, the data sharing computer system comprises the first computer system which is connected to a first network system having a third computer system. The first service unit supplies a first service to the third computer system via the first network system. The second computer system is connected to a second network system having a fourth computer system. The second service unit supplies a second service to the fourth computer system via the second network system.

According to another aspect of the present invention, the data sharing computer system comprises the second service unit which supplies the second service to the fourth computer system via the second network system which is equivalent to the first service supplied by the first service unit to the third computer system via the first network system.

According to another aspect of the present invention, the data sharing computer system comprises the first mutual exclusion unit which is connected to the access control information storing unit by a bus having bus lock function. The first mutual exclusion unit locks the bus while obtaining the access control information of the instructed data storing area, deciding whether the instructed data storing area is accessible or not accessible, and updating the access control information of the instructed data storing area to not accessible if decided as accessible. The first mutual exclusion unit locks the bus while the access control information of the instructed data storing area is being changed to access possible. The second mutual exclusion unit is connected to the access control information storing unit by the bus having bus lock function. The second mutual exclusion unit locks the bus while obtaining the access control information of the instructed data storing area, deciding whether the instructed data storing area is accessible or not accessible, and updating the access control information of the instructed data storing area to not accessible if decided as accessible. The second mutual exclusion unit locks the bus while the access control information of the instructed data storing area is being changed to access possible.

According to another aspect of the present invention, the data sharing computer system comprises the first mutual exclusion unit executes a series of operation which includes obtaining of the access control information of the instructed data storing area, deciding whether the instructed data storing area is accessible or not accessible, and updating of the access control information of the instructed data storing area to not accessible if decided as accessible, wherein the series of operation is executed using a single command; and the second mutual exclusion unit which executes a series of operation which includes obtaining of the access control information of the instructed data storing area, deciding whether the instructed data storing area is accessible or not accessible, and updating of the access control information of the instructed data storing area to not accessible if decided as accessible, wherein the series of operation is executed using a single command.

According to another aspect of the present invention, the data sharing computer system comprises the first computer system, including:

(1) a data-encrypting key storing unit for storing a data-encrypting key used for encrypting and decrypting;

(2) a data encryption and decryption executing unit for encrypting by using a specified data-encrypting key when an encryption is instructed by specifying the data-encrypting key, and for decrypting by using a specified cipher key when a decryption is instructed by specifying the data-encrypting key;

(3) a data-encrypting key re-setting unit for changing the data-encrypting key stored in the data-encrypting key storing unit; and (4) a data re-encrypting unit for instructing the first data access unit to read an encrypted data from the data storing area, for instructing the data encryption and decryption executing unit to decrypt the encrypted data read from the data storing area by specifying the data-encrypting key before changing the data-encrypting key, for instructing the data encryption and decryption executing unit to re-encrypt the decrypted data by specifying a new data-encrypting key after changing the data-encrypting key, and for instructing the first data access unit to write a re-encrypted data to an original data storing area.

According to another aspect of the present invention, a client connected to a network system comprises:

(1) a shared data transmitting and receiving unit for transmitting and receiving a shared data to and from a first computer system sharing the data with a second computer system, wherein the first computer system is connected to the network system;

(2) a data encrypting unit for encrypting the shared data transmitted from the shared data transmitting and receiving unit; and (3) a data decryption unit for decrypting the shared data received at the shared data transmitting and receiving unit.

According to another aspect of the present invention, the data sharing computer system 1 further comprises a third computer system. The third computer system and the first computer system are connected to a first network system. The first service unit supplies a service to the third computer system via the first network system. The third computer system includes a shared data cache unit for caching the shared data accessed by the service supplied by the first service unit.

According to another aspect of the present invention, the data sharing computer system comprises the first service unit which operates using a configuration information; the shared data storing unit which stores the configuration information used by the first service unit; and the second computer system which includes another storing unit; the second computer system which includes a configuration information replicating unit for reading the configuration information stored in the shared data storing unit, and for writing the configuration information read to the another storing units; and the second service unit which updates the first configuration information written to the another storing unit, and operates by using the updated configuration information.

According to another aspect of the present invention, the data sharing computer system comprises the computer system, including:

(1) an authentication method managing unit for storing an authentication method used in a user authentication by the first computer system;

(2) an authentication and permission database managing unit for previously storing a data used for the user authentication;

(3) an authenticating function unit receiving a data requiring the user authentication and an authentication request, and by using the previously stored data used for the user authentication in the authentication and permission database managing unit and the data requiring the user authentication, based on the authentication method stored in the authentication method managing unit.

According to another aspect of the present invention, the data sharing computer system comprises the data sharing computer system which is a shared memory type parallel computer comprising a bus; and the shared memory type parallel computer which includes the first computer system; the second computer system; the shared data storing unit; and the access control information storing unit connected via the bus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
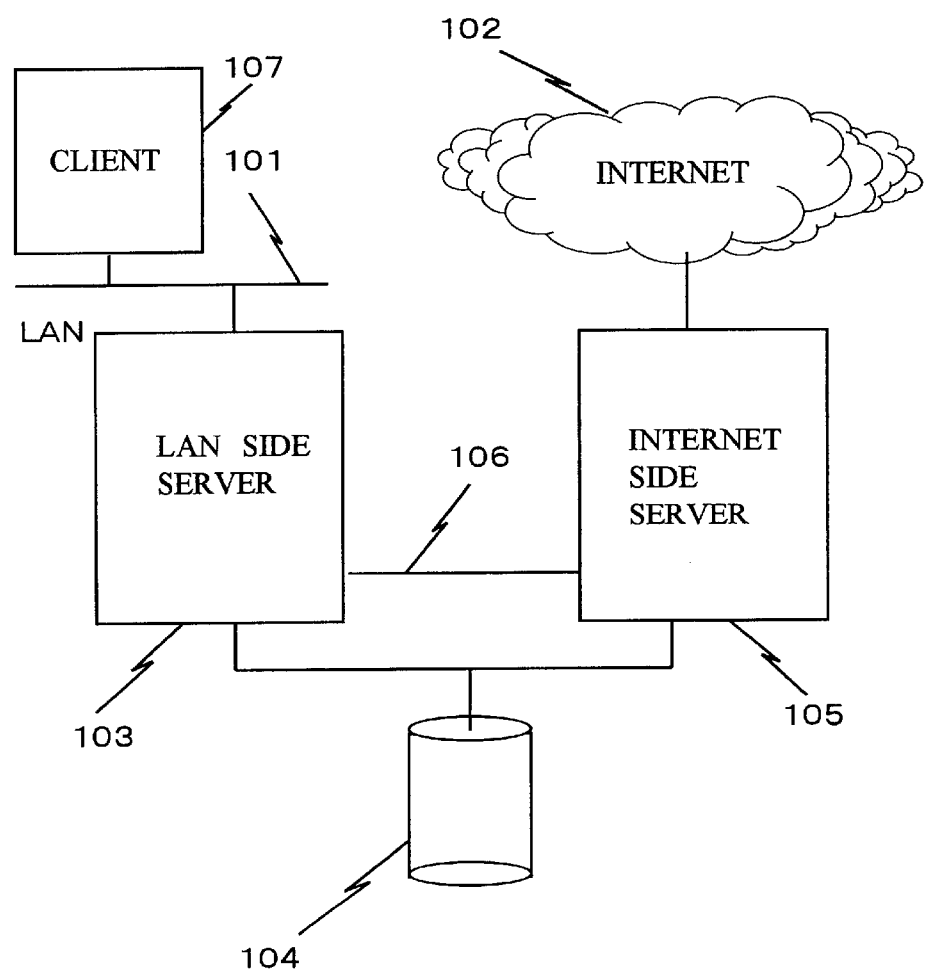
FIG. 1 illustrates a system configuration of service replicating system of embodiment 1.

Reference will now be made in detail to the present preferred embodiments of the invention, examples of which are illustrated in the accompanying drawings, wherein like reference numerals indicate like elements throughout the several views.

Hereinbelow, embodiments of the present invention will be described with reference to the drawings.

The drawings of FIGS. 1 to 11 mainly illustrate the system configuration of each embodiment. The drawings of FIGS. 12 to 49 illustrates data flows, process flows, and command configurations accompanying operations of the embodiments.

Embodiment 1

The present invention makes the following possible. The present invention can replicate service for each network, and a replicated service is used on each network. As long as the replicated service is of a client and server type service, and as long as the replicated service is implemented at each network as an application program, the replicated service can be used on each network without adding any modification to the pre-existing program of each server. For example, services such as HTTP (hypertext transport protocol) server service and IMAP4 (internet message access protocol 4) mail service correspond to this. The present embodiment describes an example of replicating and using a service of file server.

The drawing of FIG. 1 illustrates the system configuration of service replicating system. The service replicating system of FIG. 1 comprises the following elements: a LAN (local area network) 101; an internet 102; a LAN side server 103; a shared disk 104; an internet side server 105; a bus having bus lock function 106; and a LAN client 107.

The LAN side server 103 and internet side server 105 are independent servers. However, these servers are placed next to one another in the LAN, and are connected to the shared disk 104 by SCSI (small computer system interface) for sharing the shared disk 104. There is no need to place the servers next to one another, if the shared disk 104 is connected by using a technique which allows a longer connection path such as fiber channel, besides the SCSI.

The LAN side server 103 and internet side server 105 are connected by the bus having bus lock function 106. The bus having bus lock function 106 is configured to be used in a shared memory mechanism between the servers.

Figure 2:
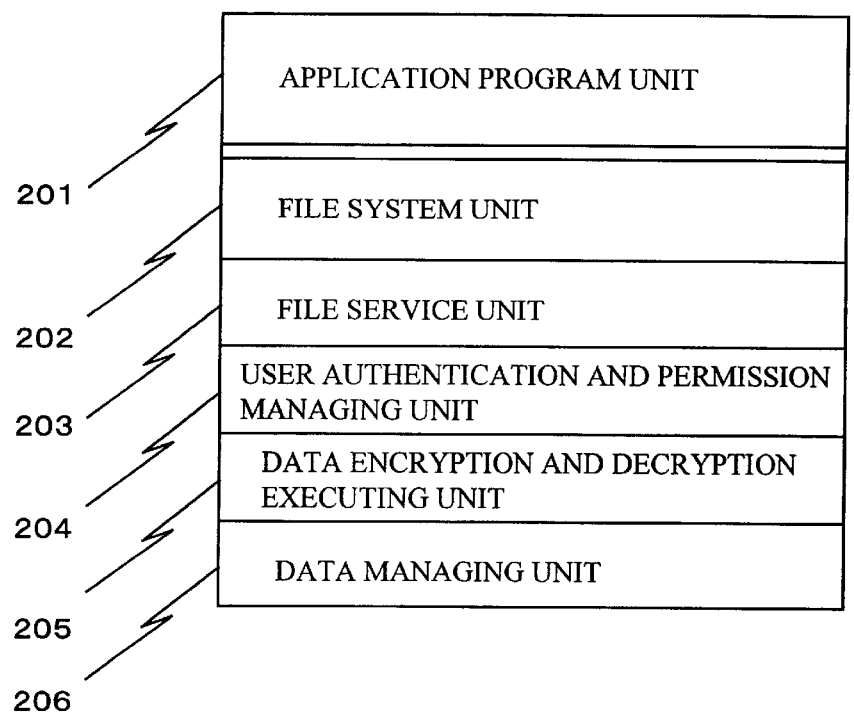
FIG. 2 illustrates a software configuration placed on each server of embodiment 1.

The drawing of FIG. 2 illustrates the software configuration of the LAN side server 103 and internet side server 105. The software configuration comprises of following elements: an application program unit 201; a file system unit 202; a file service unit 203; a user authentication and permission managing unit 204; a data encryption and decryption executing unit 205; and a data managing unit 206.

The application program unit 201 is configured to execute an application by calling the user authentication and permission managing unit 204 and the file service unit 203. The file service unit 203 is configured to call the file system 202. The file system 202 is configured to call the data managing unit 206. The data managing unit 206 is configured to call the data encryption and decryption executing unit 205. A service of the file service unit 203 is executed as a kernel code of the operating system, and a context of this execution processing is configured to be provided as 1 application.

Figure 3:
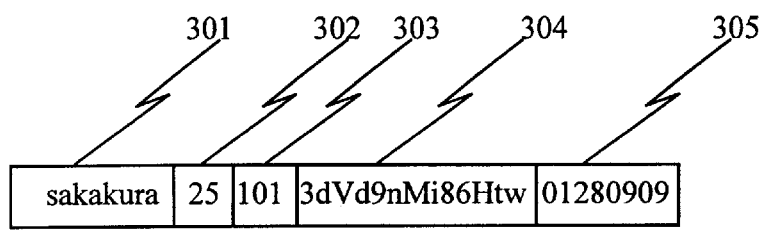
FIG. 3 illustrates an example of record in a user authentication and permission database of embodiment 1.

The drawing of FIG. 3 illustrates the example of a record in the user authentication and permission database which is managed by the user authentication and permission managing unit 204 by using the data managing unit 206. The user authentication and permission database comprises the following elements: a user ID 301; a group ID 302 of the user; a user ID 303 of the user; an authenticating data 304 of the user; and a common cipher key 305 of the user. The common cipher key 305 of the user is used for encrypting and decrypting a data by the data managing unit 206. The user authentication and permission managing unit 204 prepares a challenge method and an one-time password method in addition to a basic method of referring to a password by using a hash function. The user authentication and permission managing unit 204 is configured to select an authentication method as a user attribute.

Figure 4:
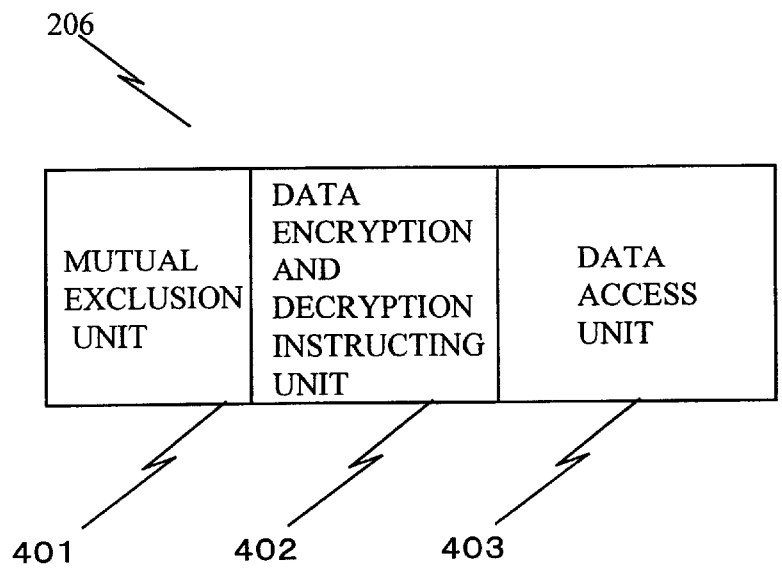
FIG. 4 illustrates a configuration of data managing unit of embodiment 1.

The drawing of FIG. 4 illustrates the configuration of data managing unit 206. The data managing unit 206 comprises the following elements: an mutual exclusion unit 401; a data encryption and decryption instructing unit 402; and a data access unit 403. The mutual exclusion unit 401 is configured to access the shared memory mechanism by using the bus having bus lock function 106, and is also configured to perform mutual exclusion in a sector unit of the shared disk 104. The data encryption and decryption instructing unit 402 is configured to instruct an encryption of data for writing into the shared disk 104 and a decryption of data for reading from the shared disk 104 to the data encryption and decryption executing unit 205. The data access unit 403 is configured to read and write in the sector unit of shared disk 104.

Figure 5:
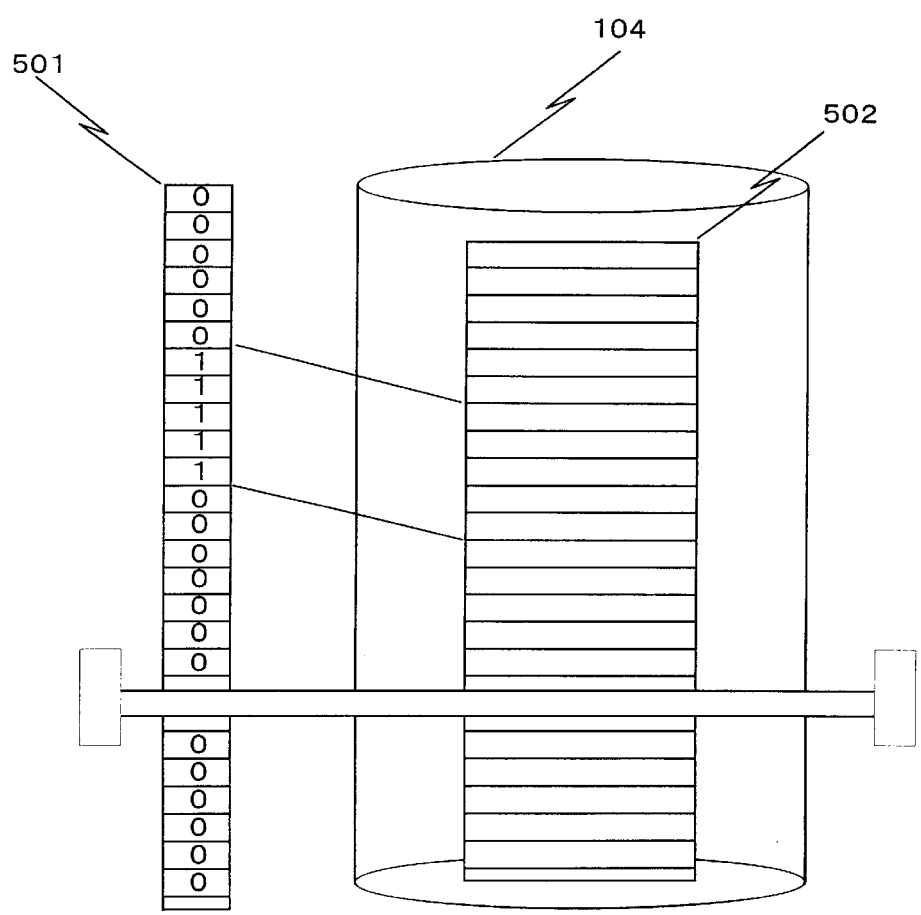
FIG. 5 illustrates an example of shared memory and shared disk sector in locked status of embodiment 1.

The drawing of FIG. 5 illustrates the example of shared memory and shared disk sector in locked status. They comprises of the following elements: lock fields 501 of the shared memory; and sectors 502 of the shared disk 104.

A basic operation of this configuration is described next.

Figure 12:
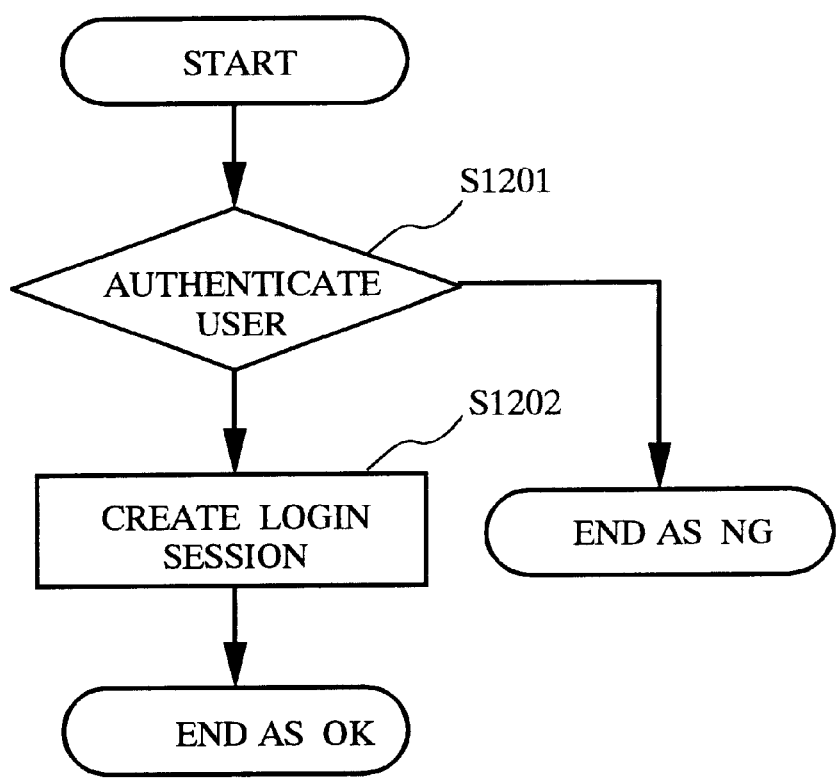
FIG. 12 illustrates a process flow of system login of embodiment 1.
Figure 13:
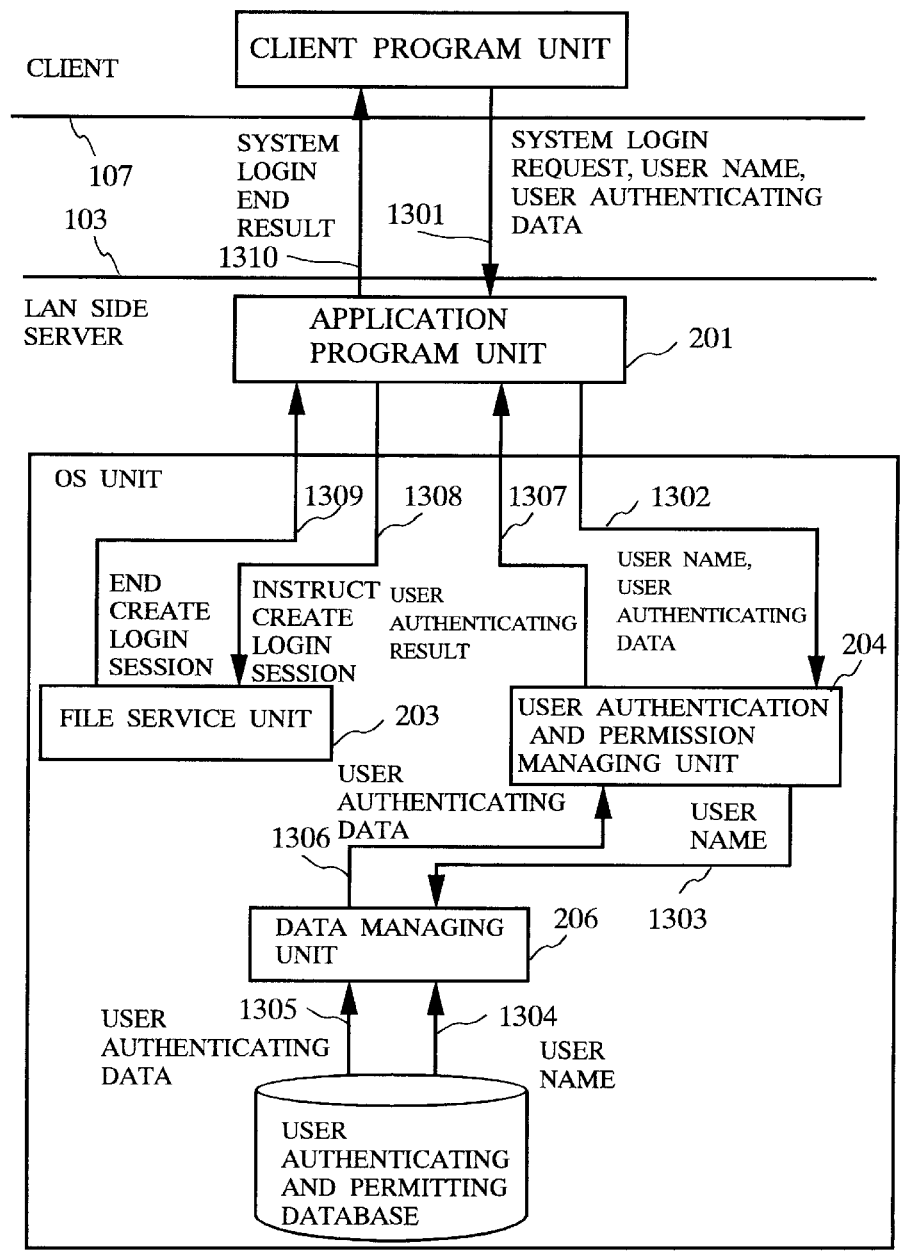
FIG. 13 illustrates a data flow of system login process of embodiment 1.

First of all, the system login process is described with reference to the drawings of FIGS. 12 and 13. FIG. 12 illustrates the process flow of system login. FIG. 13 illustrates the data flow of system login process.

In the system login, a user is authenticated in step S1201, and if an user authentication was successful, a login session is created in step S1202.

Next, the file open process is described with reference to the drawings of FIGS. 14 and 15.

Figure 14:
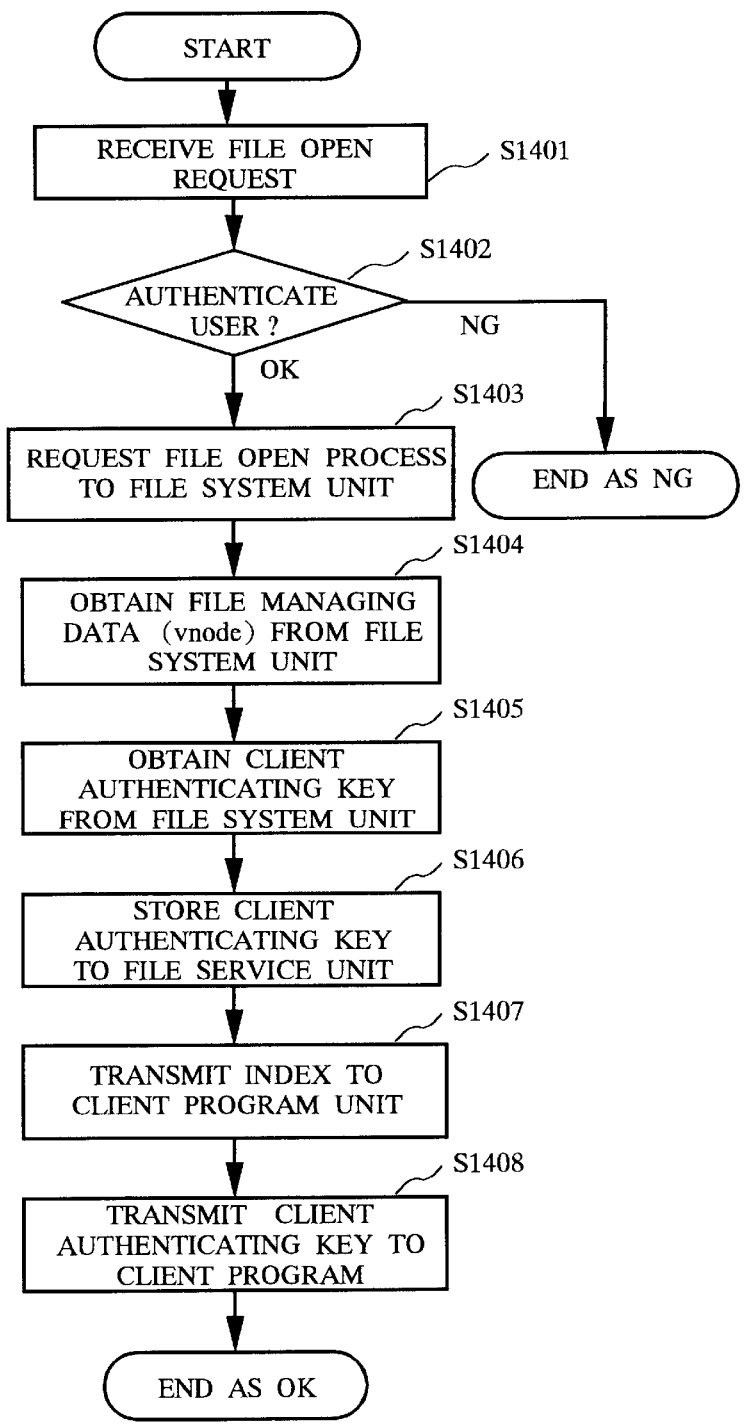
FIG. 14 illustrates a process flow of file open of embodiment 1.
Figure 15:
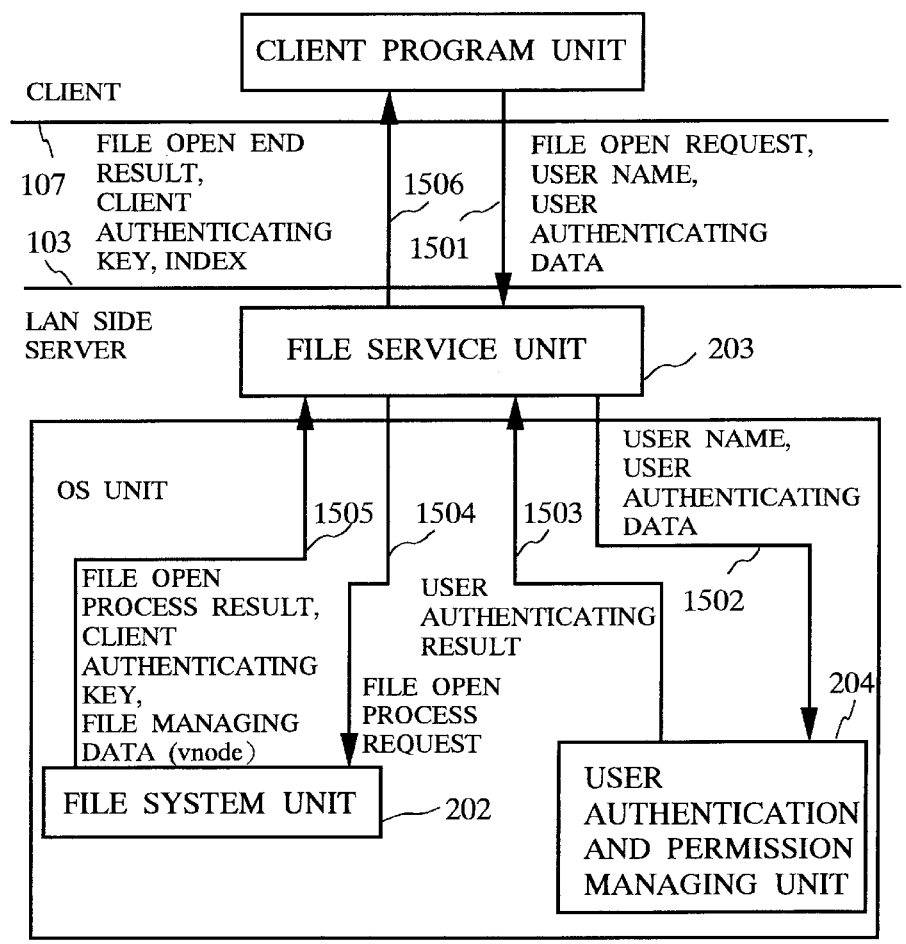
FIG. 15 illustrates a data flow of the file open process of embodiment 1.

The drawing of FIG. 14 illustrate the process flow of file open by the file service unit 203. The drawing of FIG. 15 illustrates the data flow of file open process.

The file service unit 203 receives a file open request from a client program unit of the client 107 (refer to S1401 and 1501). Then, the file service unit 203 authenticates a user (refer to S1402, 1502 and 1503). When the user authentication was successful, the service unit 203 requests for a file open process to the file system unit 202 (refer to S1403, 1504). As a result of the file open process, a file managing data (normally called vnode) and a client authenticating key are obtained from the file system unit 202 (refer to S1404, S1405 and 1505).

The file service unit 203 stores an obtained client authenticating key in step S1406. After this step, if a data access is requested from the client 107 to the file service unit 203, the file service unit 203 performs an authentication process by comparing a stored client authenticating key and a client authenticating key included in a file open process request message from the client (refer to steps S1603 and S2303). In other words, the file service unit 203 itself performs the authentication process without relying on the user authentication and permission managing unit 204.

The file managing data (vnode) is data to be managed by the file system unit 202 for every file. The file managing data (vnode) is used for managing information such as access right, size, open count, and seek pointer of file, and a disk block address where a file data will be placed. The file managing data (vnode) is used not only for cases of accessing via the file service unit 203, but also used in cases of accessing the file system unit 202 from other application programs. In this case, specifically, system calls such as read, write, and seek based on the file managing data (vnode) are performed in the file system unit 202. The file system unit 202 interprets these system calls, and accesses to the corresponding disk areas.

The file service unit 203 transmits a file open end result, the client authenticating key, and an index to the client program unit (refer to S1406, S1407, S1408 and 1506), and completes the file open process.

Figure 16:
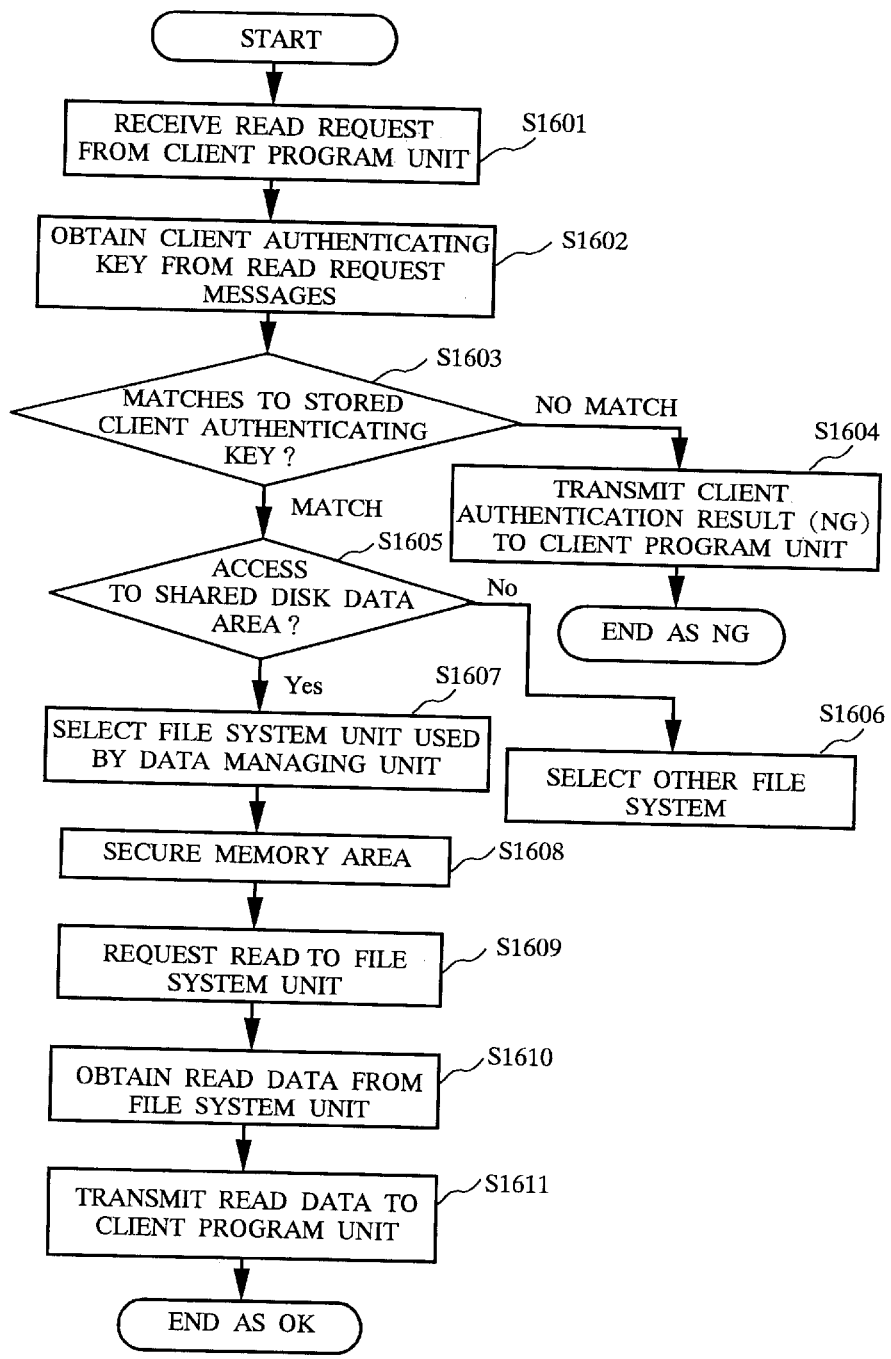
FIG. 16 illustrates a process flow of read by file service unit of embodiment 1.
Figures 17, 18:
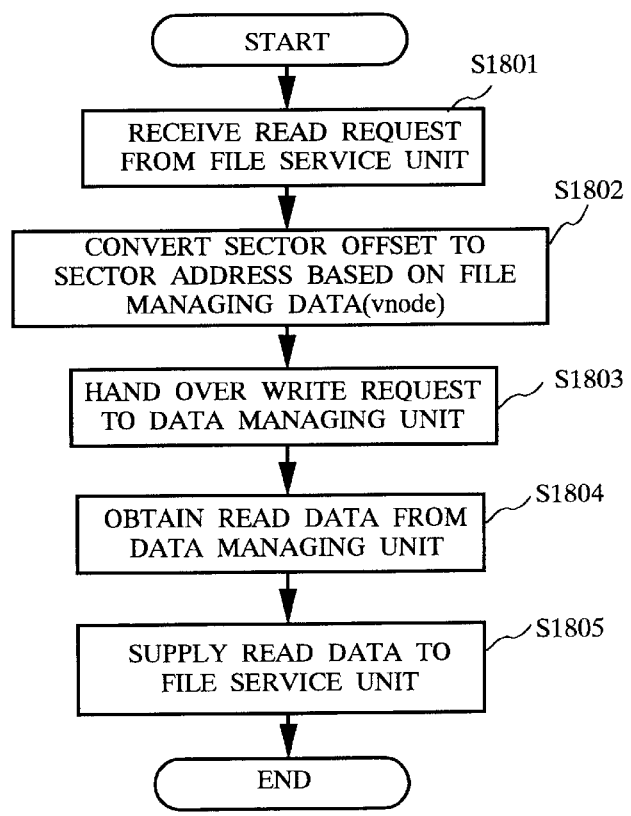
FIG. 17 illustrates an example of read request message of embodiment 1.
FIG. 18 illustrates a process flow of read by file system unit of embodiment 1.
Figure 19:
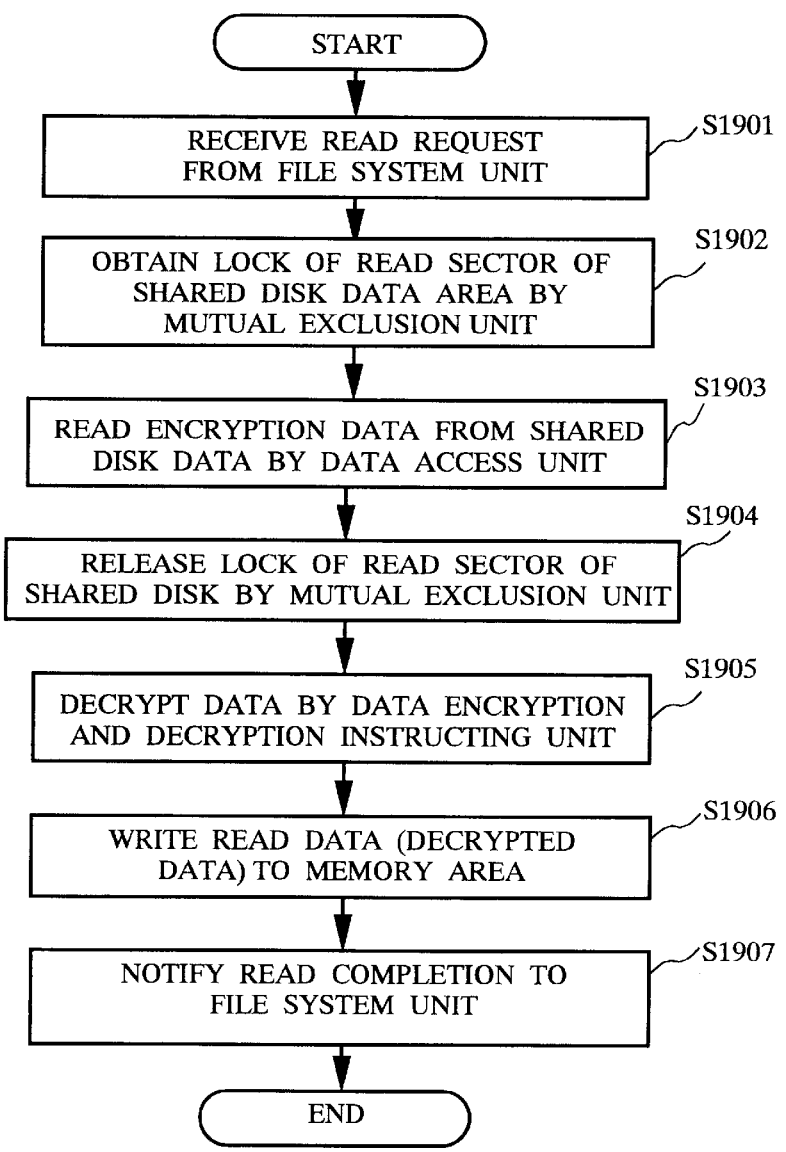
FIG. 19 illustrates a process flow of read by the data managing unit of embodiment 1.
Figure 20:
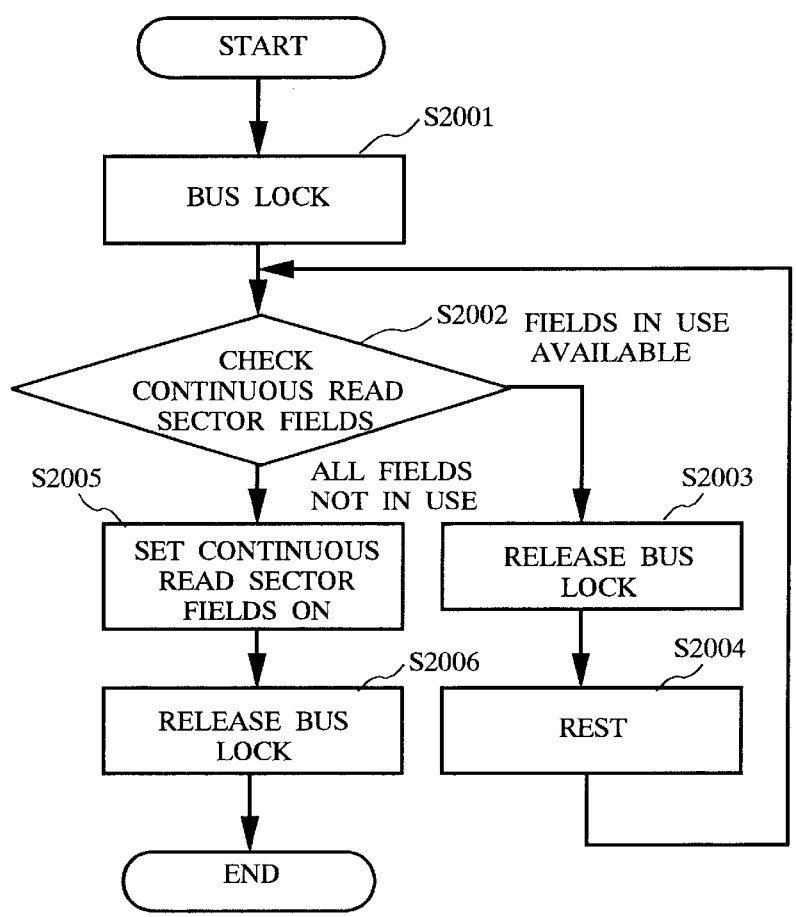
FIG. 20 illustrates a process flow of obtaining lock for read sector of shared disk area of embodiment 1.
Figure 21:
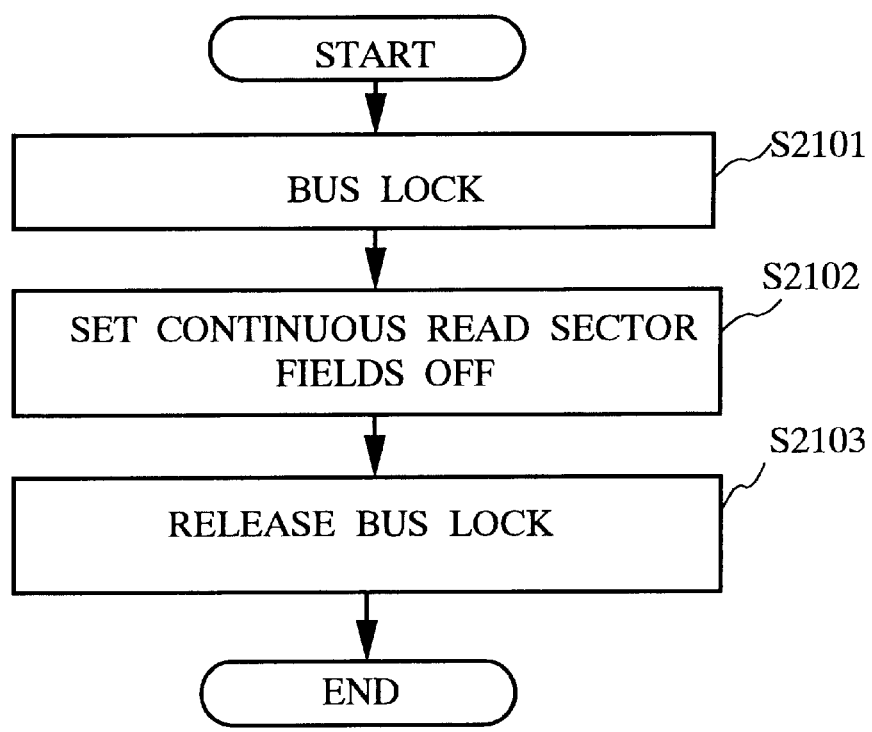
FIG. 21 illustrates a process flow of releasing lock for the read sector of shared disk area of embodiment 1.
Figure 22:
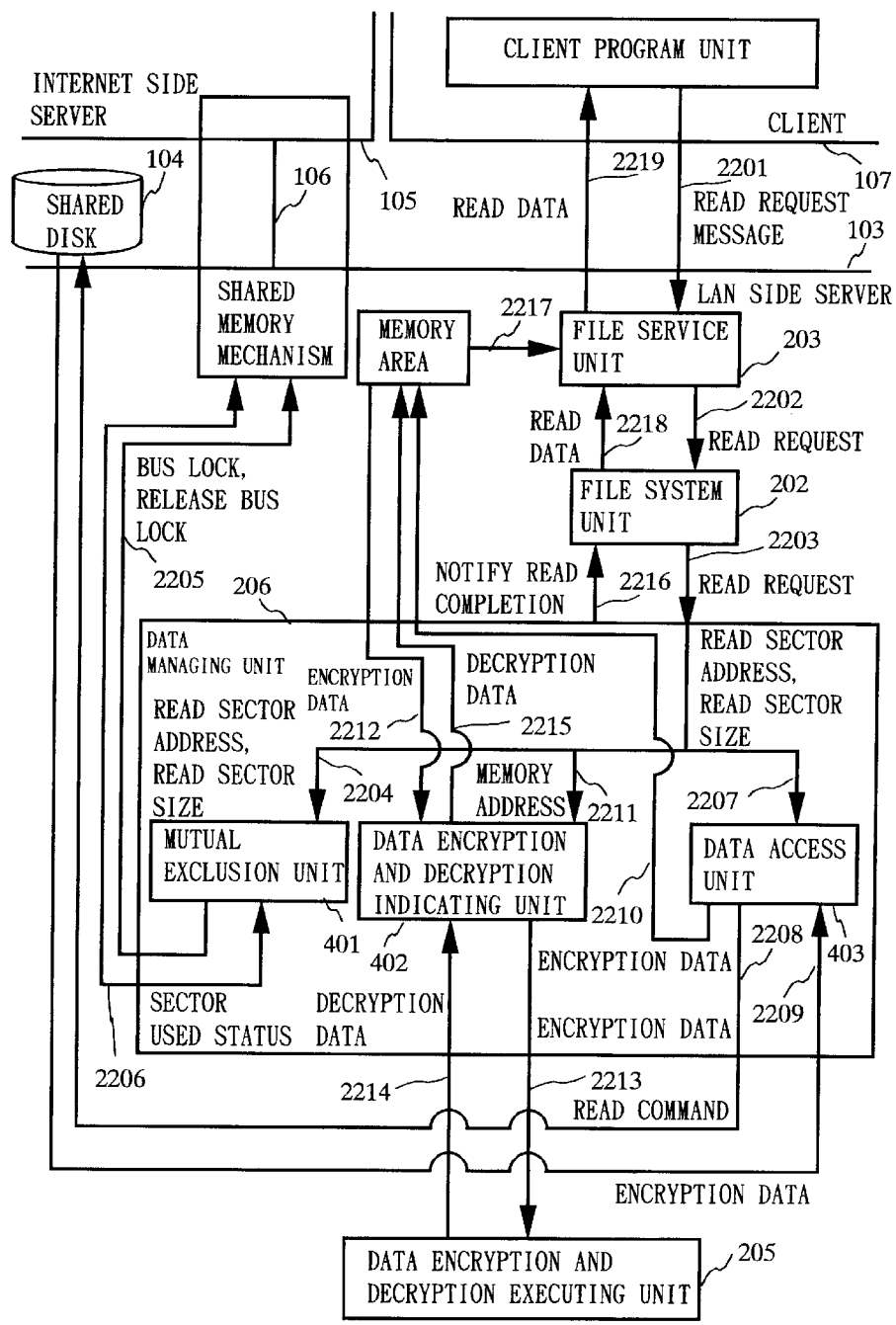
FIG. 22 illustrates a data flow of read process of embodiment 1.

Next, a read process is described with reference to the drawings of FIGS. 16 to 21. FIG. 16 illustrates the process flow of read by the file service unit 203. FIG. 17 illustrates the example of read request message. FIG. 18 illustrates the process flow of read by the file system unit 202. FIG. 19 illustrates the process flow of read by the data managing unit 206. FIG. 20 illustrate the process flow of obtaining lock for the read sector of shared disk area. FIG. 21 illustrates the process flow of releasing lock for the read sector of shared disk area. FIG. 22 illustrates the data flow of read process.

The file service unit 203 supplies a known UDP port (user datagram protocol) to the client program unit, and performs a file service by accepting the read process request from the client 107 for the same port. The client program unit transmits a read request message to the file service unit 203, and the file service unit 203 interprets the read request message and supplies the service (refer to S1601 and 2201).

The read request message has a format illustrated in FIG. 17. The read request message comprises: an index 1701 to an array of pointers to the file managing data (vnode); an user ID 1702; a client authenticating key 1703; a service content 1704 (in the drawing, 1 denotes to read); a read start sector offset 1705; and a read sector size 1706.

As illustrated in the drawing of FIG. 16, the file service unit 203 obtains the client authenticating key 1703 in the read request message in step S1602, compares the client authenticating key 1703 of steps 1602 with the client authenticating key stored during the file open process in step S1406, and continues the processing if they match instep S1603.

If a data area for reading is a shared disk data area of the shared disk 104, then in steps S1605 and S1607 the file system unit 202 is selected (not the other file system) which uses the data managing unit 206 which manages the shared disk data area.

The file service unit 203 secures a memory area in step S1608 and outputs a read request to the file system unit 202 (refer to S1609, 2202). Together with the read request, the file service unit 203 hands over a pointer to the file managing data (vnode), a read start sector offset, a read sector size, a first address of a secured memory area to the file system unit 202, all at the same time. Normally, access from a user to the file system unit 202 is performed via the system call, however, for the read request such as in this case, an inner function of the file system unit 202 is used.

As illustrated in the drawing of FIG. 18, when the file system unit 202 receives the read request (refer to S1801, 2202), then in step S1802 the file system unit 202 converts a read start sector offset of the file managing data (vnode) to the read sector address managed by the data managing unit 206, and then outputs the read request to the data managing unit 206 (refer to S1803 and 2203). Togetherwith the read request, the file system unit 202 hands over an user ID, a read sector address, the read sector size and the first address of the memory area to the data managing unit 206, all at the same time.

As illustrated in the drawing of FIG. 19, the data managing unit 206 receives the read request from the file system unit 202 (refer to S1901 and 2203) and obtains a lock of read sector of the shared disk data area by the mutual exclusion unit 401 in step S1902.

The shared memory mechanism which is accessed by the mutual exclusion unit 401 is implemented at a hardware configuration which can refer and update a data for every 1 bit, and can lock the bus by using the bus having bus lock function 106. The mutual exclusion unit 401 uses this hardware configuration, and maps a sector address of the shared disk to a byte address of the shared memory mechanism.

As illustrated in FIGS. 20 and 22, the mutual exclusion unit 401 receives the read sector address and the read sector size (refer to 2204), acquires a bus lock (refer to S2001, 2205), and checks the byte address of all shared memory mechanism corresponding to continuous read sectors, or in other words, checks the lock fields (refer to S2002, 2206). When there is a lock field indicating "read sector in use" among the read sectors, the bus lock is released (refer to S2003, 2205), rests for a certain period of time (refer to S2004), and repeats retry after that. In cases when all of the lock fields are indicating "read sector not in use", then the mutual exclusion unit 401 writes 1 to those lock fields under a bus lock status (1 indicates that the sector corresponding to lock field is in use) (refer to S2005, 2206). After that, the bus lock is released (refer to S2006, 2205).

FIG. 5 illustrates the example of shared disk sector and shared memory in locked status. A head of the lock fields 501 of the shared memory corresponds to a first sector of the shared disk. In this example, 7th to 11th lock fields are in use. So, a sector 7 to sector 11 of the shared disk corresponding to 7th to 11th lock fields are in the locked status, therefore, this means that these sectors are not accessible by users other than the user who has obtained the lock.

The data managing unit 206 reads a disk data from the read sector by the data access unit 403 (refer to S1903, 2208, 2209), and stores a content of the disk data to the memory area specified by the address (refer to 2210).

When the reading ends, the data managing unit 206 releases the lock by the mutual exclusion unit 401 in step S1904. A releasing of the lock is performed by obtaining a bus lock (refer to S2101, 2205), and by writing 0 to the lock fields (refer to S2102, 2206), as illustrated in FIGS. 21 and 22. After that, the bus lock is released (refer to S2103, 2205). The data managing unit 206 decrypts the data read into the memory area by the data encryption and decryption instructing unit 402 (refer to step S1905). The data encryption and decryption instructing unit 402 specifies the user ID provided from the file system unit 202, and obtains the common secret key 305 of the user from the user authentication and permission managing unit 204. The data encryption and decryption instructing unit 402 uses the common secret key 305 to instruct the data encryption and decryption executing unit 205 to execute the decryption (refer to 2212, 2213, 2214). A decrypted data is written to the memory area (refer to S1906, 2215) and the read process returns to the file system unit 202 (refer to S1907, 2216).

The file system unit 202 returns to the file service unit 203 (refer to S1805, 2218).

The file service unit 203 returns a data read to a port of client program which received the read request, and completes the read process (refer to S1611, 2219).

Figure 23:
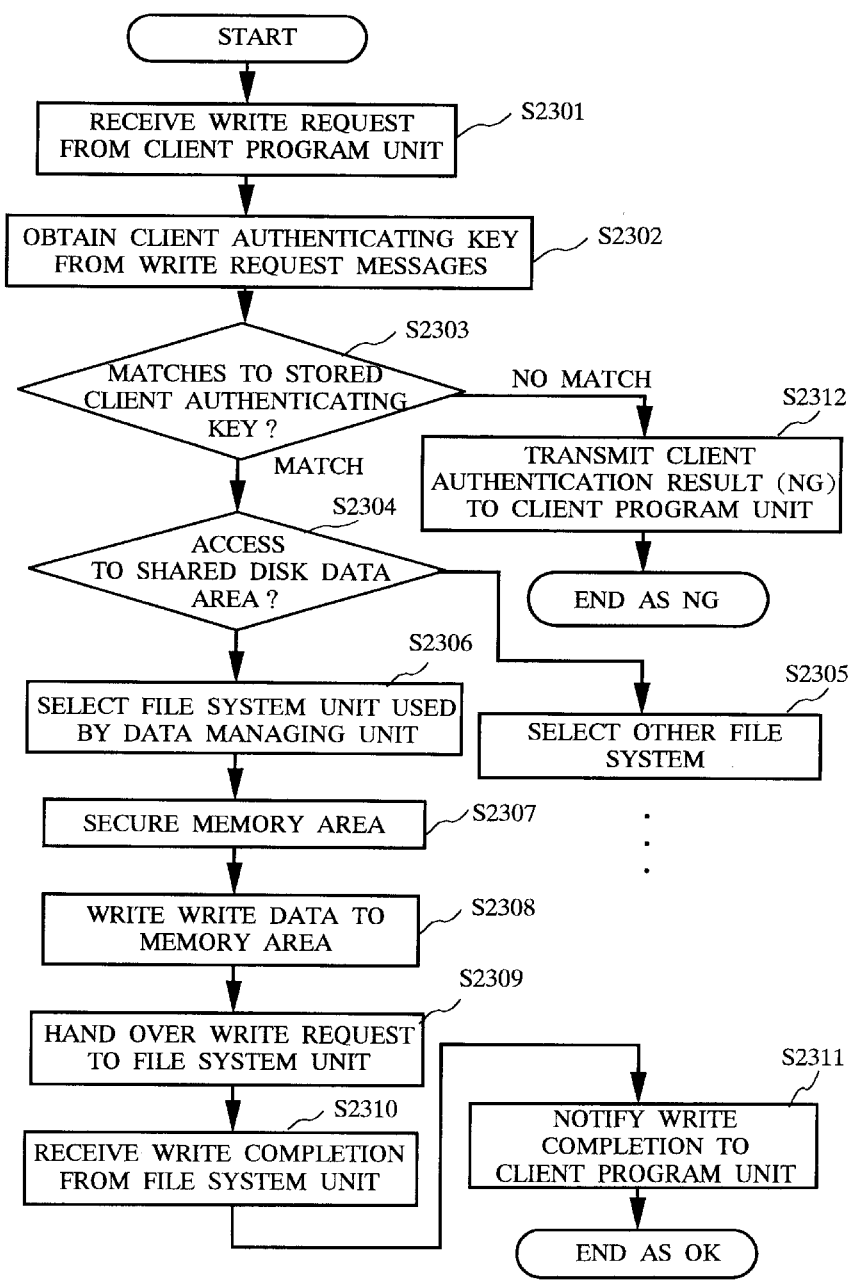
FIG. 23 illustrates a process flow of write by a file service unit of embodiment 1.
Figures 24, 25:
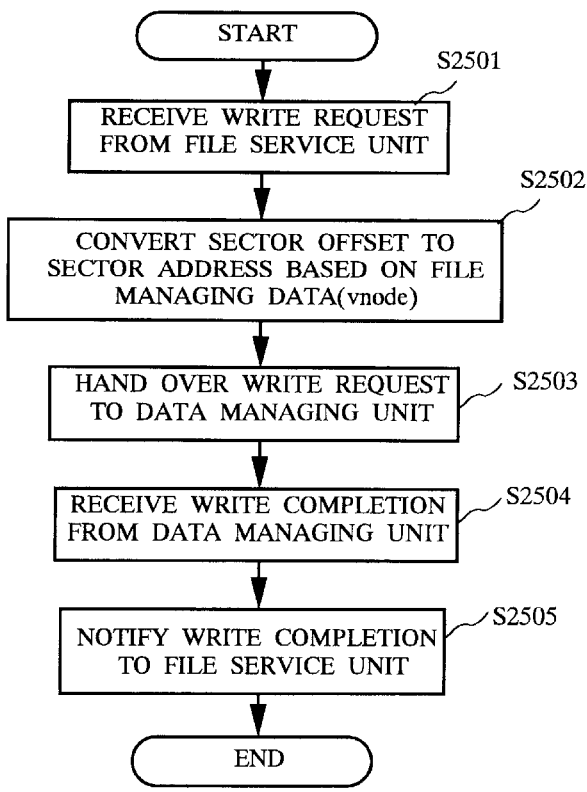
FIG. 24 illustrates an example of write request message of embodiment 1.
FIG. 25 illustrates a process flow of write by the file system unit of embodiment 1.
Figure 26:
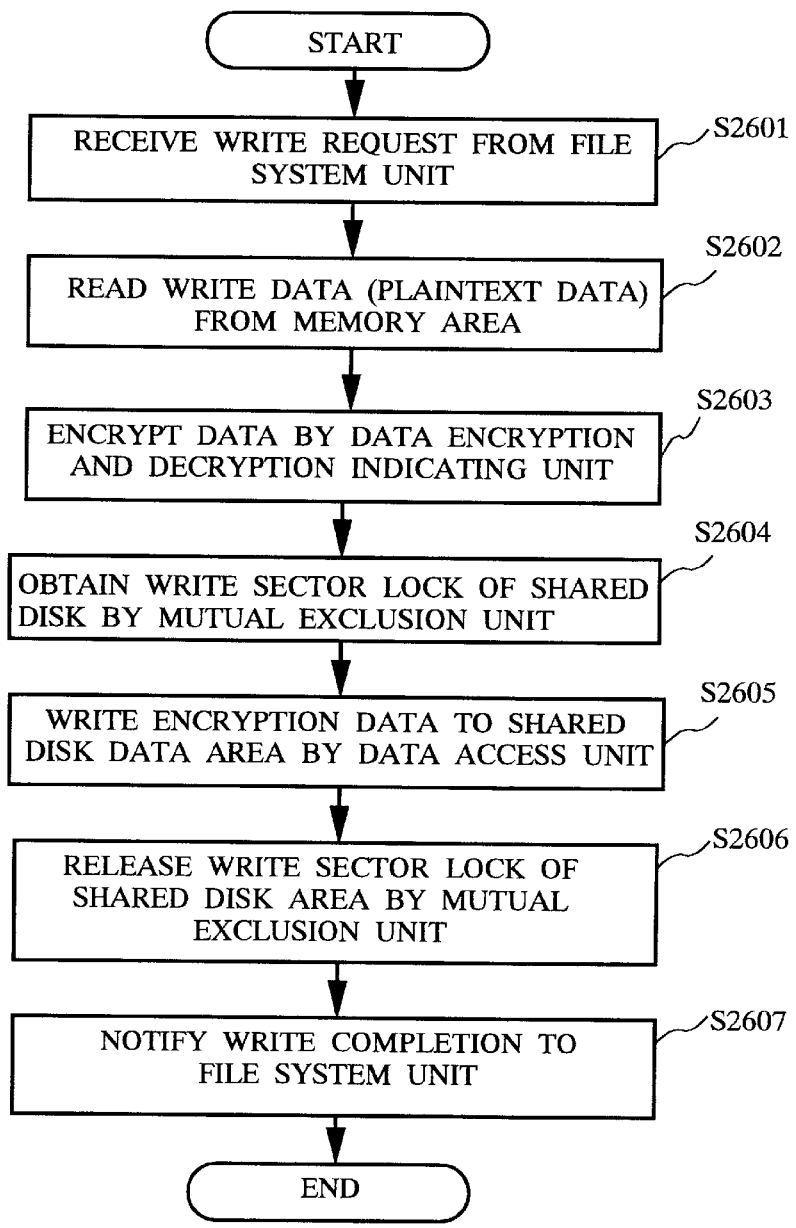
FIG. 26 illustrates a process flow of write by the data managing unit of embodiment 1.
Figure 27:
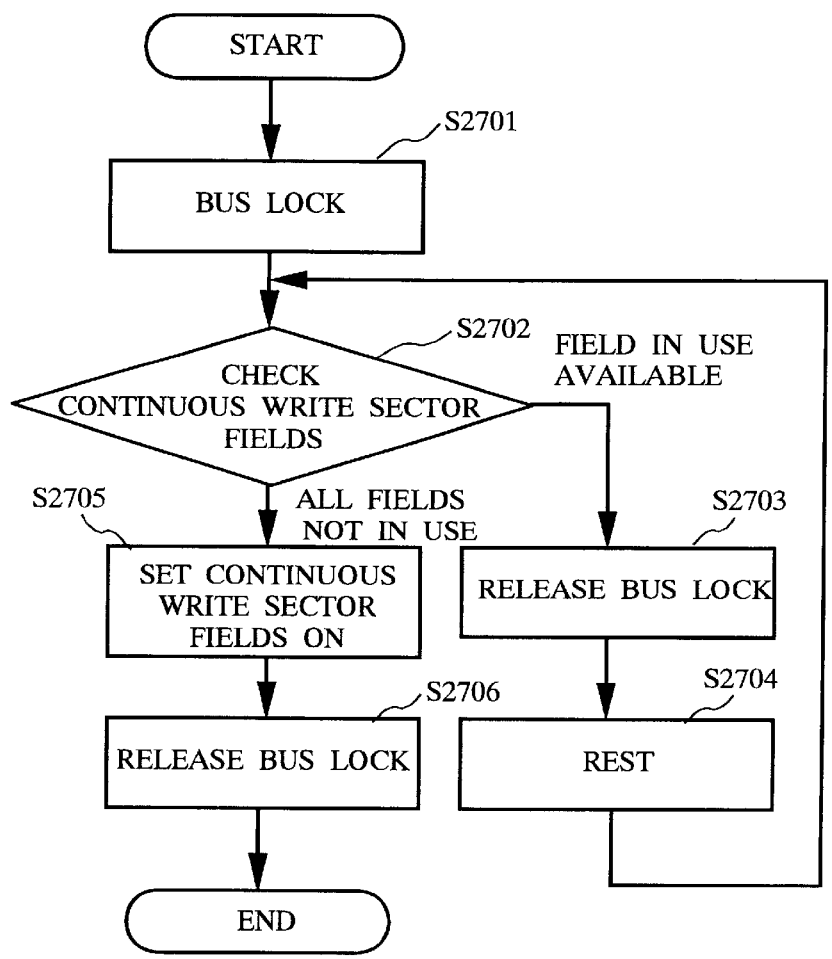
FIG. 27 illustrates a process flow of obtaining lock for write sector of shared disk area of embodiment 1.
Figure 28:
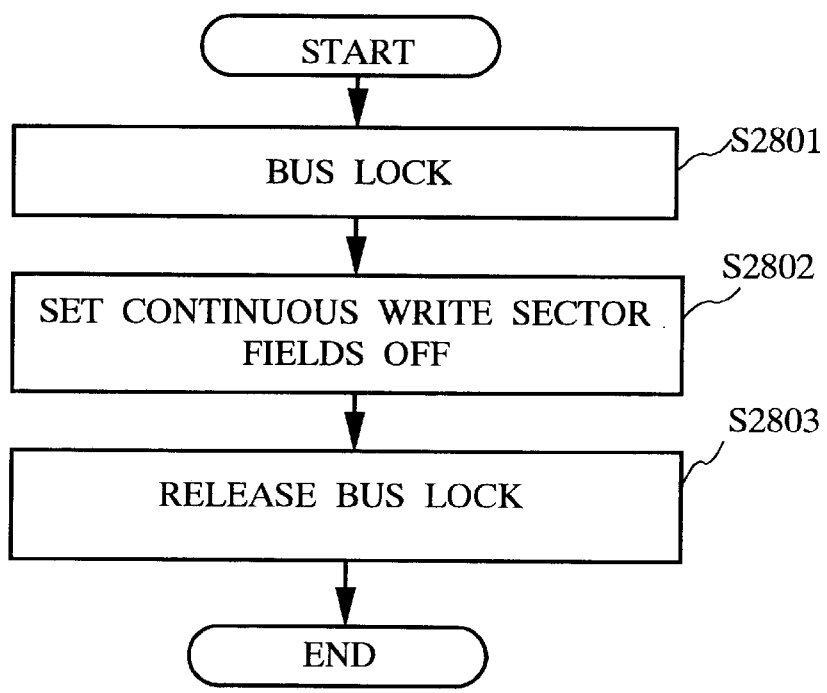
FIG. 28 illustrates a process flow of releasing lock for the write sector of shared disk area of embodiment 1.
Figure 29:
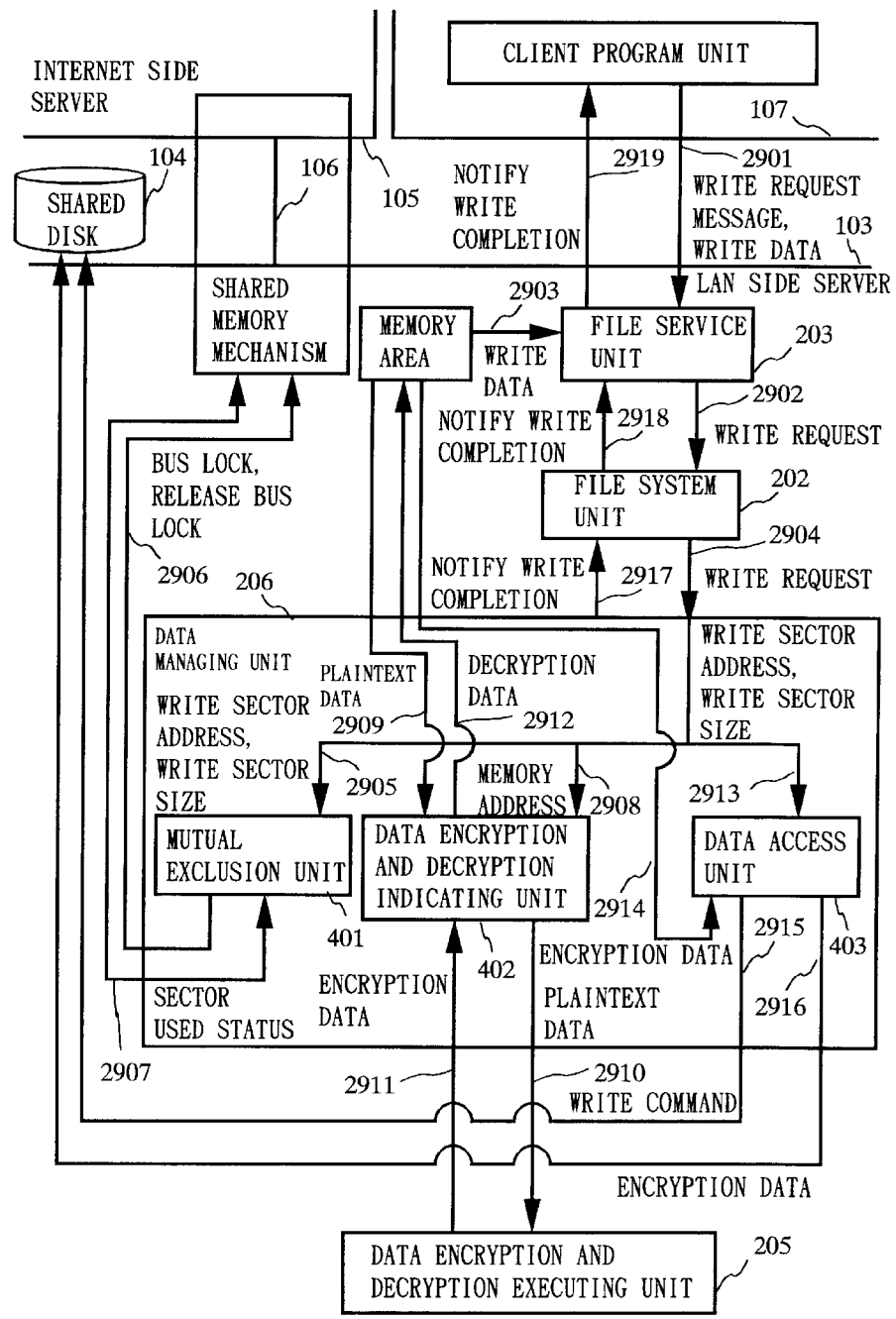
FIG. 29 illustrates a data flow of read process of embodiment 1.

Next, a write process is described with reference to the drawings of FIGS. 23 to 29. FIG. 23 illustrates the process flow of write by the file service unit 203. FIG. 24 illustrates the example of write request message. FIG. 25 illustrates the process flow of write by the file system unit 202. FIG. 26 illustrates the process flow of write by the data managing unit 206. FIG. 27 illustrates the process flow of obtaining lock for the write sector of the shared disk area. FIG. 28 illustrates the process flow of releasing lock for the write sector of the shared disk area. FIG. 29 illustrates the data flow of read process.

The file service unit 203 receives a write request message, in a same manner as the read process (refer to S2301, 2901). The write request message has a format shown in FIG. 24. The write request message comprises the following elements: an index 2401 to array of pointers to the file managing data (vnode); an user ID 2402; a client authenticating key 2403; a content of service 2404 (in the drawing, 0 denotes to write); a write start sector offset 2405; a write sector size 2406; and a write data 2407.

Similar to the read process, a write request is handed over to the file system unit 202 (refer to S2309, 2902). The file system unit 202 hands over a first address of memory area to the data managing unit 206 the followings: the user ID; the write sector address; the write sector size; the first address of memory area storing the write data. Similar to the read process, the data encryption and decryption instructing unit 402 obtains the common secret key 305 of the user based on the user ID, and instructs the data encryption and decryption executing unit 205 to execute encryption (refer to S2603, 2909 to 2912). Also, similar to the read process, the mutual exclusion unit 401 obtains a lock of write sector of the shared disk area (refer to S2604, 2906, 2907), then the data access unit 403 writes an encryption data (refer to S2605, 2915, 2916), and after that the mutual exclusion unit 401 releases the lock (refer to S2606, 2906, 2907).

According to the present embodiment, a data can be shared safely, for example, between the organization's local network system and the internet. According to the present embodiment, a service can be replicated and used at each network.

Embodiment 2

Figure 6:
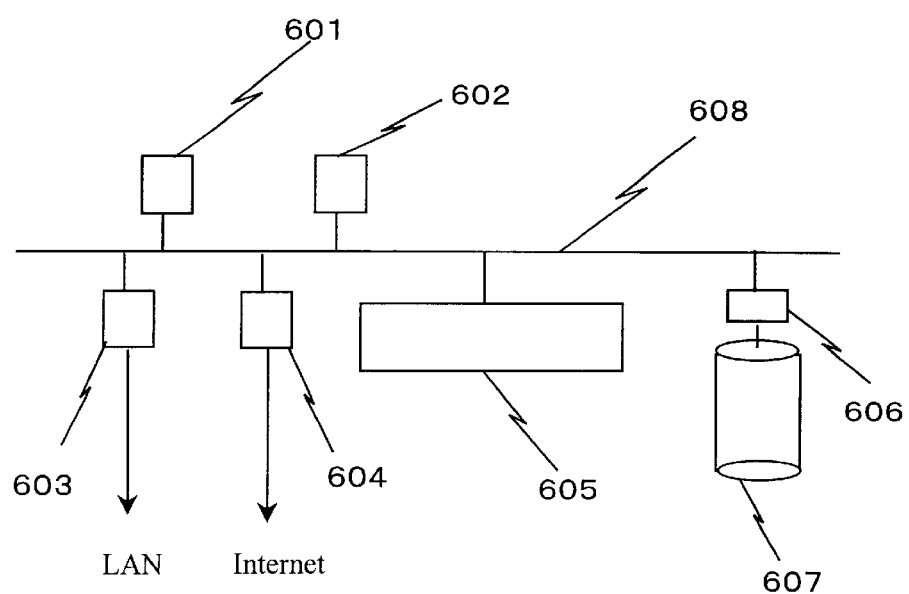
FIG. 6 illustrates an example of system configuration of a parallel computer of embodiment 2.

Next, a system of the shared memory type parallel computer which partitions each network off is described. The drawing of FIG. 6 illustrates the example of system configuration of the parallel computer. The parallel computer of FIG. 6 comprises the following devices: CPUs 601 and 602; ethernet controllers 603 and 604; a memory 605; a disk controller 606; a disk 607; and a memory bus 608.

The CPUs 601 and 602, the ethernet controllers 603 and 604, the shared memory 605, and the disk 607 are all connected by the memory bus 608. The CPU comprises a test-and-set command. The CPU is configured to perform access from the CPU to each device and interrupt from each device to the CPU via a register which is mapped to a specific address of the memory bus. The test-and-set command will be described later.

The shared memory area and the shared disk area are set to a part of the memory 605 and disk 607. The CPU 601 belonging to a LAN is connected to the ethernet controller 603 which is connected to the LAN. The CPU 602 belonging to an internet is connected to the ethernet controller 604 which is connected to the internet. The CPU 601 and CPU 602 are separated by a virtual space, and both are configured in such a way so that their respective ethernet controllers and the memory areas of their respective networks cannot be accessed by one another.

Figure 30:
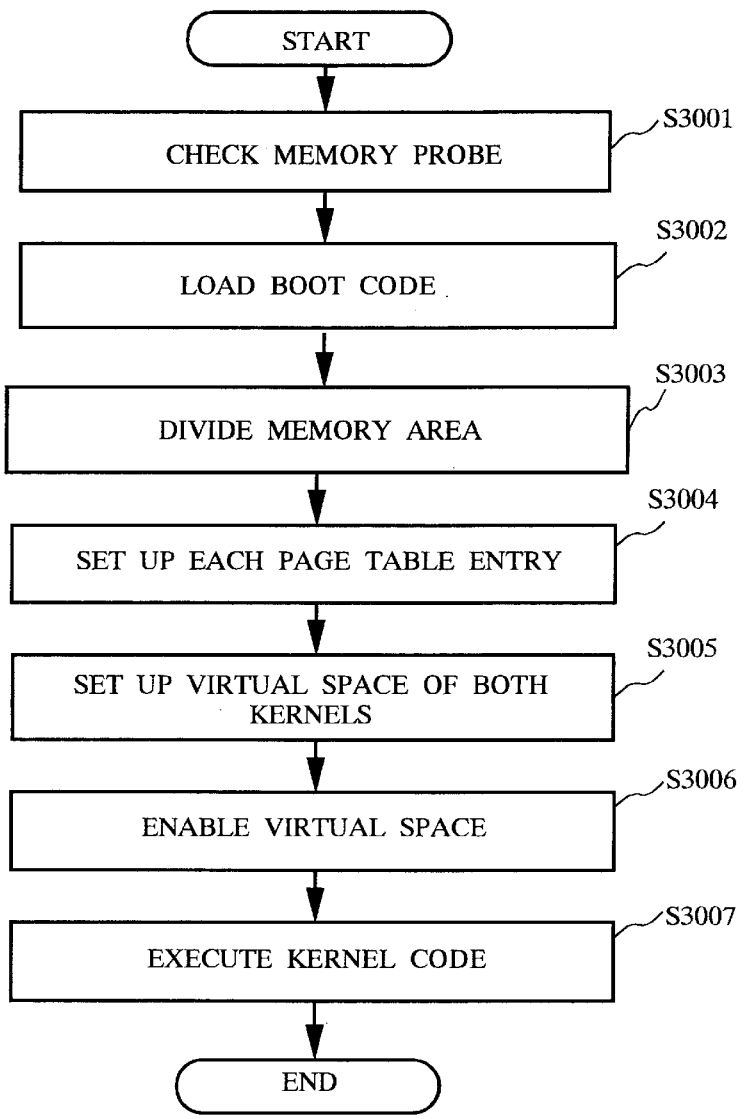
FIG. 30 illustrates a basic operation of embodiment 2.

The basic operation of this configuration is described with reference to the drawing of FIG. 30.

When this system is reset, only the CPU 601 starts execution of ROM code under a disk disable status of virtual memory. At this time, the CPU 602 is in the disk disable status.

Figure 7:
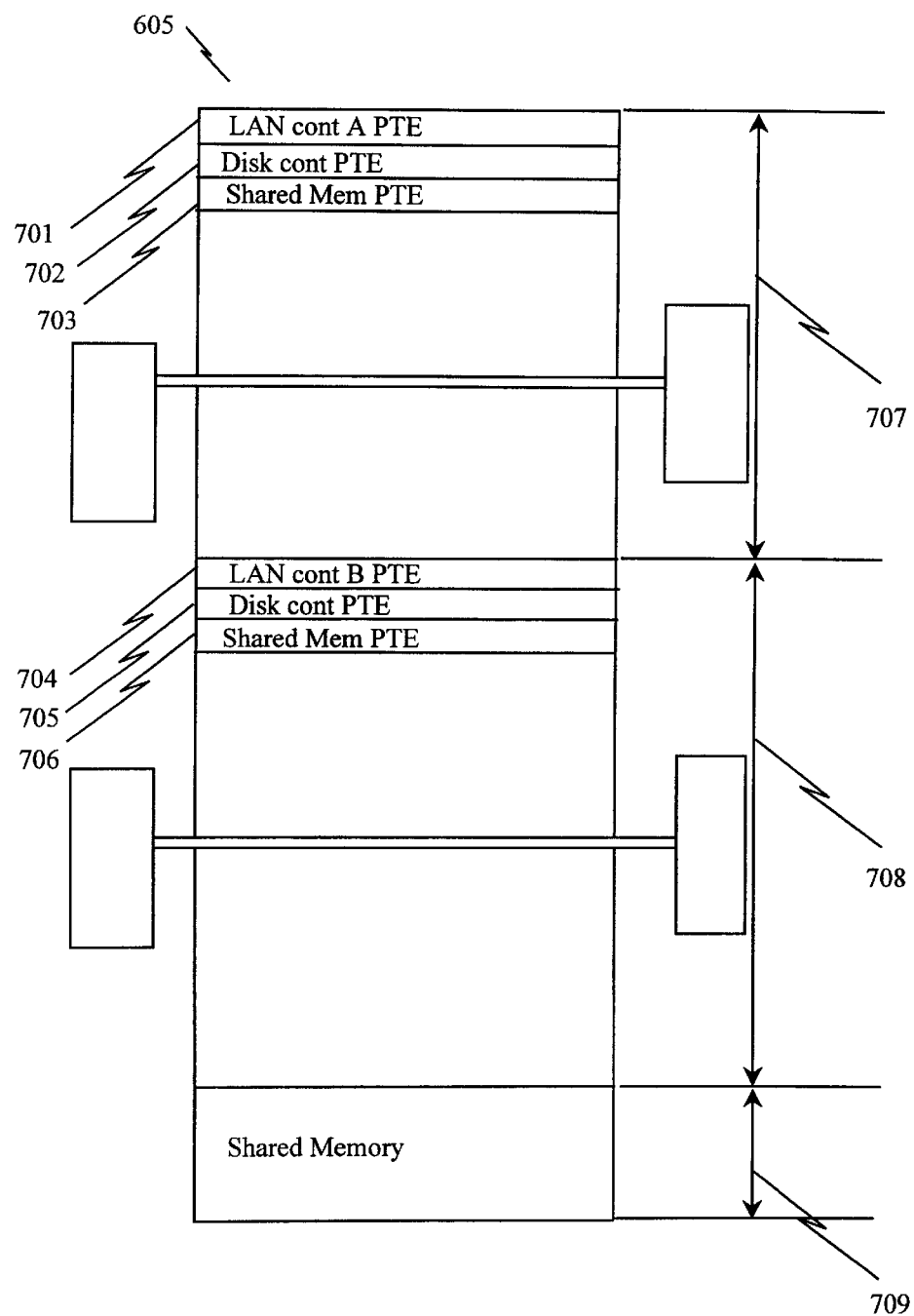
FIG. 7 illustrates an example of memory distribution of embodiment 2.

The CPU 601 obtains an usable memory by executing a memory probe check in step S3001, and loads and executes a boot code in step S3002. In step S3003, the memory is checked by executing the boot code, and in step S3003 the memory area is divided by executing the boot code as illustrated in the drawing of FIG. 7. FIG. 7 illustrates the example of memory division, and comprises the followings: a memory area 707 used by the CPU 601 belonging to the LAN; a memory area 708 used by the CPU 602 belonging to the internet; and a shared memory area 709 used for mutual exclusion.

When a memory area division has been decided, then a page table forming a virtual space of each CPU is set up in step S3004.

In the memory area 707 of CPU 601, the following entries are being set up: a page table entry 701 to a register area of the ethernet controller 603; a page table entry 702 to a controller register area of the shared disk area; a page table entry 703 to the shared memory area; and a page table entry of kernel code using area of the CPU 601.

Likewise, in the memory area 708 of CPU 602, the following entries are being set up: a page table entry 704 to a register area of the ethernet controller 604; a page table entry 705 to the controller register area of the shared disk; a page table entry 706 to the shared memory area; and a page table entry of kernel code using area of the CPU 602.

A virtual space of the kernel is equivalently set up at two areas other than the area occupied by the page table entries of FIG. 7. Identical kernel codes are loaded to the identical kernel virtual address. The CPU 602 enables a virtual memory to start execution from a start address of the kernel code. The CPU 601 also enables the virtual memory, and jumps to its start address, and starts an execution of the kernel code (refer to steps S3006 and S3007).

Figure 31:
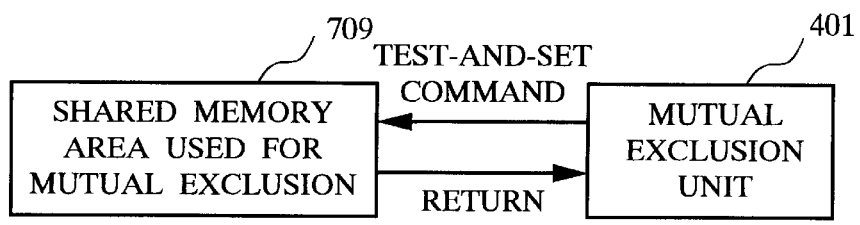
FIG. 31 illustrates a lock mechanism of test-and-set command embodiment 2.
Figure 32:
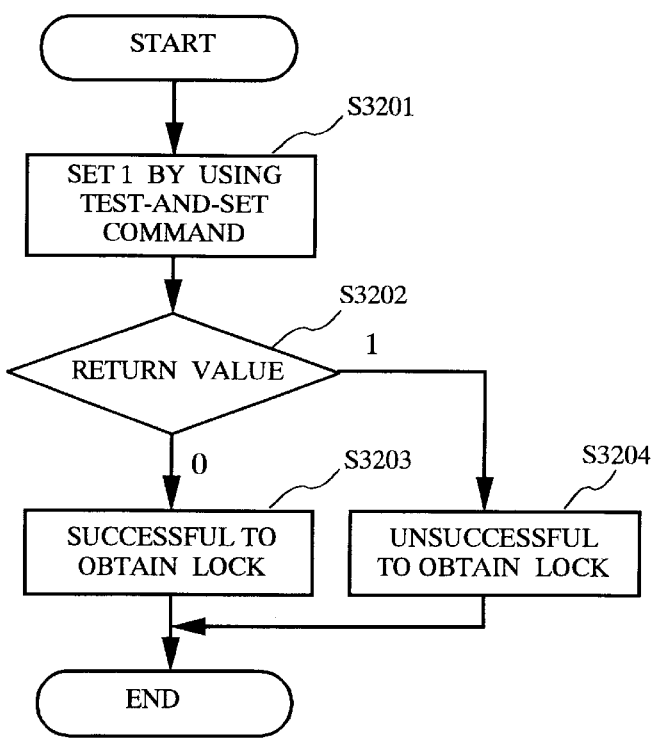
FIG. 32 illustrates a flow for deciding a result of obtaining lock of embodiment 2.

A software which is identical to the software illustrated in the embodiment 1 is executed at each CPU of the embodiment 2, however, a processing method of the mutual exclusion unit 401 of embodiment 2 is different from the one in embodiment 1. The mutual exclusion unit 401 of embodiment 1 obtained lock and released lock of the read sector of shared disk area by using the bus lock mechanism of a shared memory bus, however, in the embodiment 2, as illustrated in the drawing of FIG. 31, lock obtaining process and lock releasing process for a lock field of the shared memory 605 are performed by a lock mechanism by using the test-and-set command. The test-and-set command is a command for atomically referring and updating a data of the memory. As illustrated in the drawing of FIG. 32, for the lock obtaining process, the lock is obtained by setting 1 to the lock field in step S3201. Then, in step S3203 if the value obtained by the same command is 0, this means that the lock obtaining was successful, and in step S3204 if this value is 1, the lock obtaining was unsuccessful since an other party has already obtained the lock. Also, for the lock releasing process the lock is released by rewriting the lock field to 0 by using the test-and-set command.

As can be seen from the present embodiment, the system which partitions each network off is implemented on the shared memory type parallel computer. A safety factor of the system is improved by removing an intrusion by a network into another network.

Embodiment 3

In the present embodiment, a mechanism of periodically re-encrypting an encrypted data of the shared disk that can be referred from a plurality of networks is described. The encrypted data are re-encrypted using different keys.

As described in the embodiment 1, the user authentication and permission managing unit 204 manages a user authentication and permission database comprised of records including the common secret key 305 is illustrated in FIG. 3. When the user sets the secret key upon registration, the user authentication and permission managing unit 204 stores an encrypted data. In addition to that, in the present embodiment, since a user utilizes a data-encrypting key re-setting and re-encryption command (known as "setenckey" command) supplied by the system, a data-encrypting key can be changed and re-encryption of data by using the data-encrypting key can be performed.

The "setenckey" command is prepared only for the operating system or only for an intranet side server 103 in order to improve the safety factor. Also, to increase the safety factor, it is also effective to provide a re-encrypting API (application programming interface) to the intranet side server 103 only, which will be described later on. Next, the basic operations of executing re-encryption of data and re-setting of the data-encrypting key will be described with reference to the drawings of FIGS. 33 to 38.

Figures 33, 34:
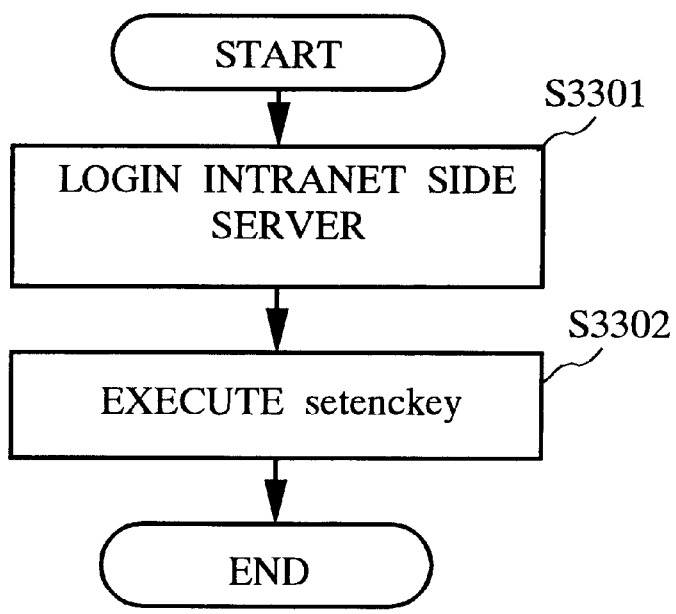
FIG. 33 illustrates a process flow of server side of embodiment 3.
FIG. 34 illustrates a format of "setenckey" command of embodiment 3.

In step S3301, a user logins to the intranet side server 103 after the user is authenticated. In step S3302, a "setenckey" command shown in FIG. 34 is executed. In this drawing, 3401 denotes to a new cipher key.

A "setenckey" process is described with reference to the drawing of FIG. 35. By executing the "setenckey" command, the user authentication and permission managing unit 204 changes the data-encrypting key of a record in the user authentication and permission database to a new data-encrypting key specified (refer to steps S3501, S3502).

Figures 35, 36:
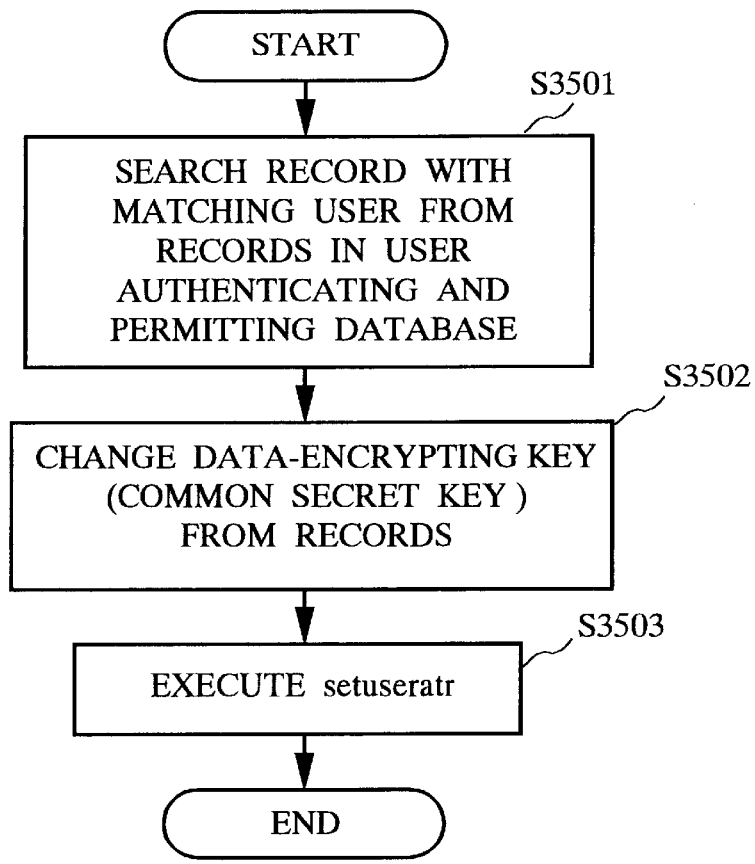
FIG. 35 illustrates a process flow of "setenckey" command of embodiment 3.
FIG. 36 illustrates a format of "setuseratr" of embodiment

After that, in step S3503, an API system call "setuseratr" shown in FIG. 36 to the file system is issued. The API system call "setuseratr" comprises the followings: a user ID 3601; an old data-encrypting key 3602; and a new data-encrypting key 3603. Taking the record shown in FIG. 3 as an example, the API system call "setuseratr" means to "change an old data-encrypting key 01280909 of a user Sakakura to a new data-encrypting key 01010101.

Figure 37:
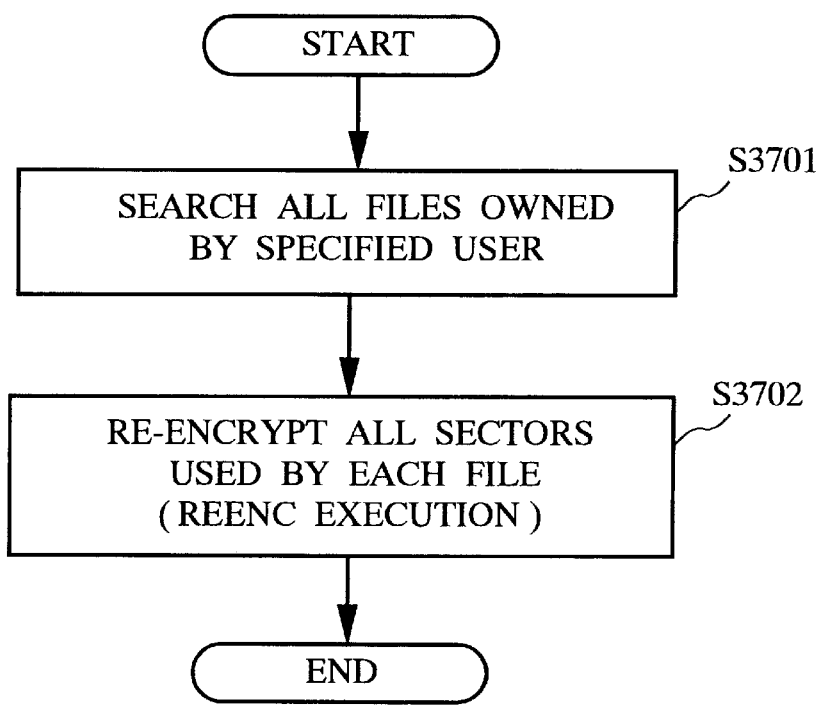
FIG. 37 illustrates a process flow of "setuseratr" of embodiment 3.

A "setuseratr" process is described with reference to the drawing of FIG. 37. Upon execution of the system call "setuseratr", among all the files that are managed by the file system unit 202, the file system unit 202 searches for those files that are owned by the user in step S3701. In step S3702, the file system unit 202 invokes the data managing unit 206 to issue a re-encryption command "reenc" against the sectors of user's files found as a result of the search. In specific terms, an array of entries is handed over to the re-encryption command "reenc" as a parameter and called. The parameter comprises the followings: an old data-encrypting key; a new data-encrypting key; update sector chunk numbers, a sector address; and an array having entries by an amount of sector chunk numbers of the sector size.

Figure 38:
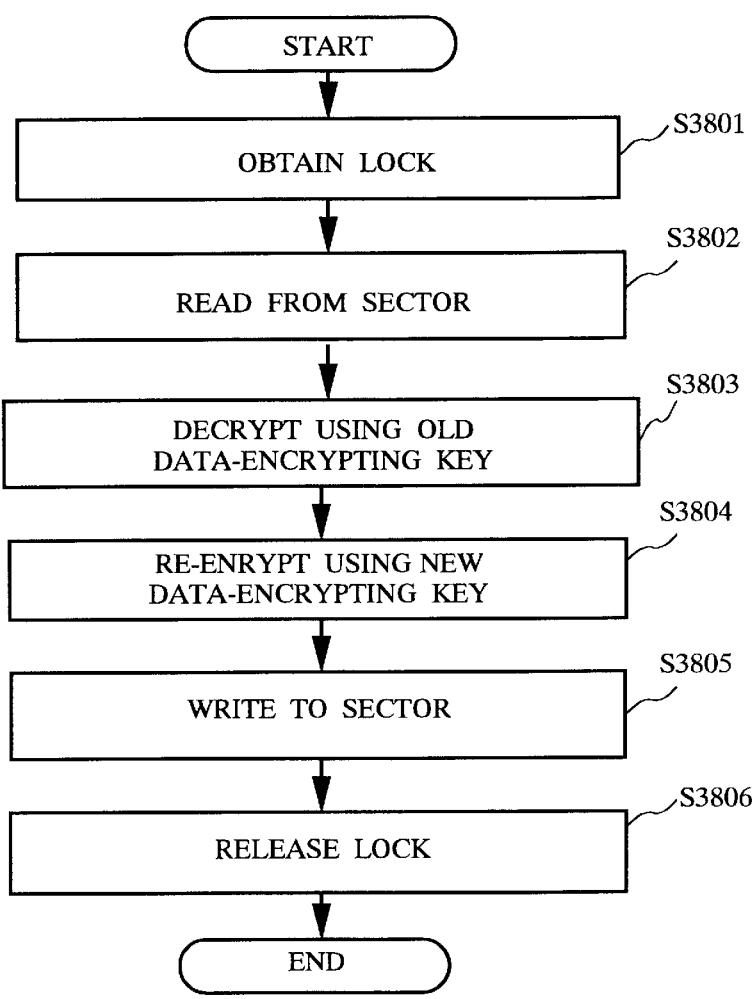
FIG. 38 illustrates a process flow of "reenc" of embodiment 3.

A "reenc" process is described with reference to the drawing of FIG. 38. Similar to the operation of read or write by the data managing unit 206 described in the embodiment 1, the "reenc" process obtains locks of all the sectors indicated by the array in step S3801. After that, all sector data are read in step S3802, and the sector data are decrypted by using the old data-encrypting key by the data encryption and decryption function in step S3803. A decrypted sector data is re-encrypted using the new data-encrypting key in step S3804, and a re-encrypted sector data is re-written to the disk in step S3805. When re-writing to all the sectors are complete, all of the obtained locks are released in step S3806, and the "reenc" process returns to the file system unit 202.

When the system call ends, the process is returned to the user authentication and permission managing unit 204 and the execution of "setenckey" command is finished.

The server described in the present embodiment is configured to protect a system from an unauthorized access of the third party by means of user authentication, however, the re-encryption mechanism of the present embodiment is advantageous in that the data secrecy can be improved just in case the unauthorized login of the third party happens to be permitted.

Embodiment 4

In the present embodiment, as one of the ways to improve a safety and secrecy of the data in a system, how an encrypted data stored in the server is decrypted by the client is described.

Figure 8:
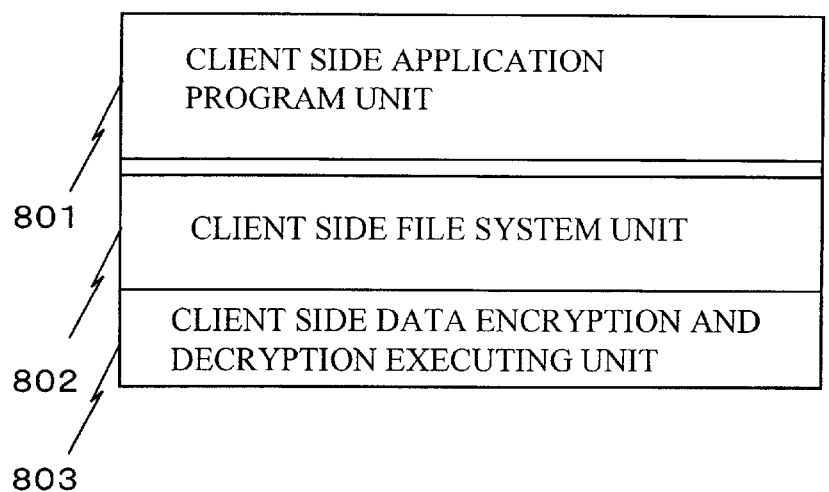
FIG. 8 illustrates a client software configuration of embodiment 4.

The drawing of FIG. 8 illustrates the software configuration of the client using the server, comprising: a client side application program unit 801 which operates on the client program; a client side file system unit 802 including function as a client to the file service unit 203 of the embodiments 1 and 2; and a client side data encryption and decryption executing unit 803 having function equivalent to the data encryption and decryption executing unit 205. For example, if a client uses a mobile terminal, then this means that there is only one user per client.

The client side application program unit 801 is configured to perform read and write operations of file to the client side file system unit 802 in a similar manner to the application program unit of the server of the embodiment 1.

The basic operation of the present embodiment is described next with reference to the drawings of FIGS. 39 to 41.

Figure 39:
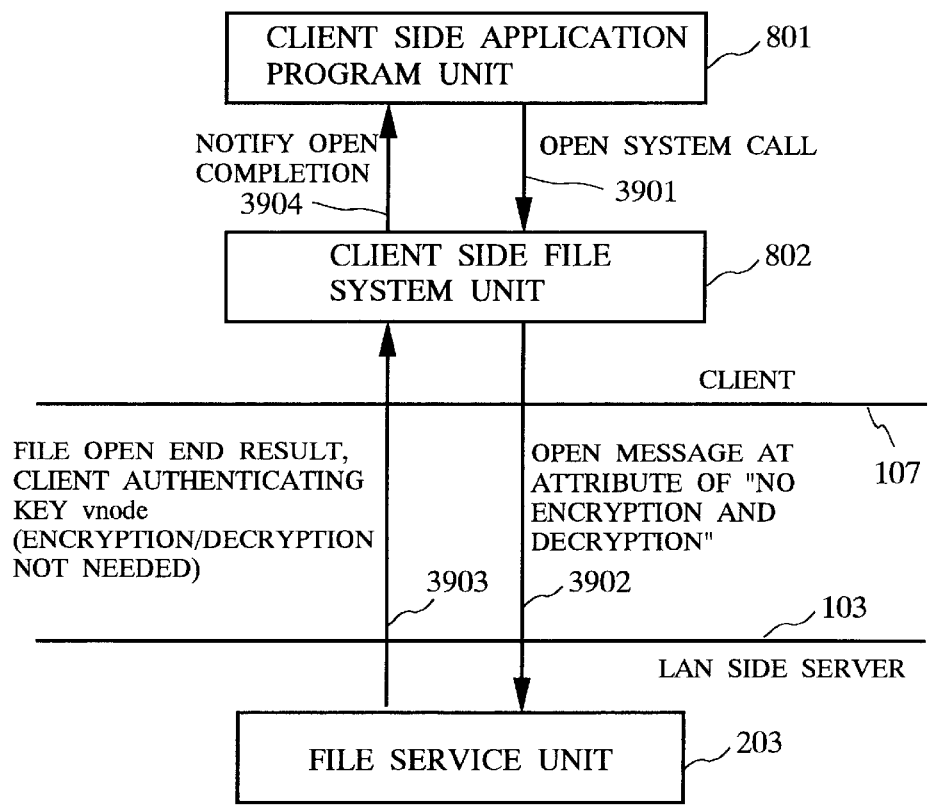
FIG. 39 illustrates a data flow of open process of embodiment 4.

The drawing of FIG. 39 illustrates the data flow of open process. The client side file system unit 802 interprets an open system call 3901, and transmits an open message having an attribute of "no encryption and decryption" to the known UDP port of the file service unit 203 of the server (refer to 3902). The open process of the embodiment 4 is processed in a similar manner as the embodiment 1, other than a fact that a data of "encryption and decryption not needed" is included in the vnode (refer to 3903). While the file is being open at an attribute of "encryption and decryption not needed", the "encryption and decryption needed" process is not permitted, and on contrary, while the file is being opened under the attribute of "encryption and decryption needed", the "encryption and decryption not needed" process is not permitted.

Figure 40:
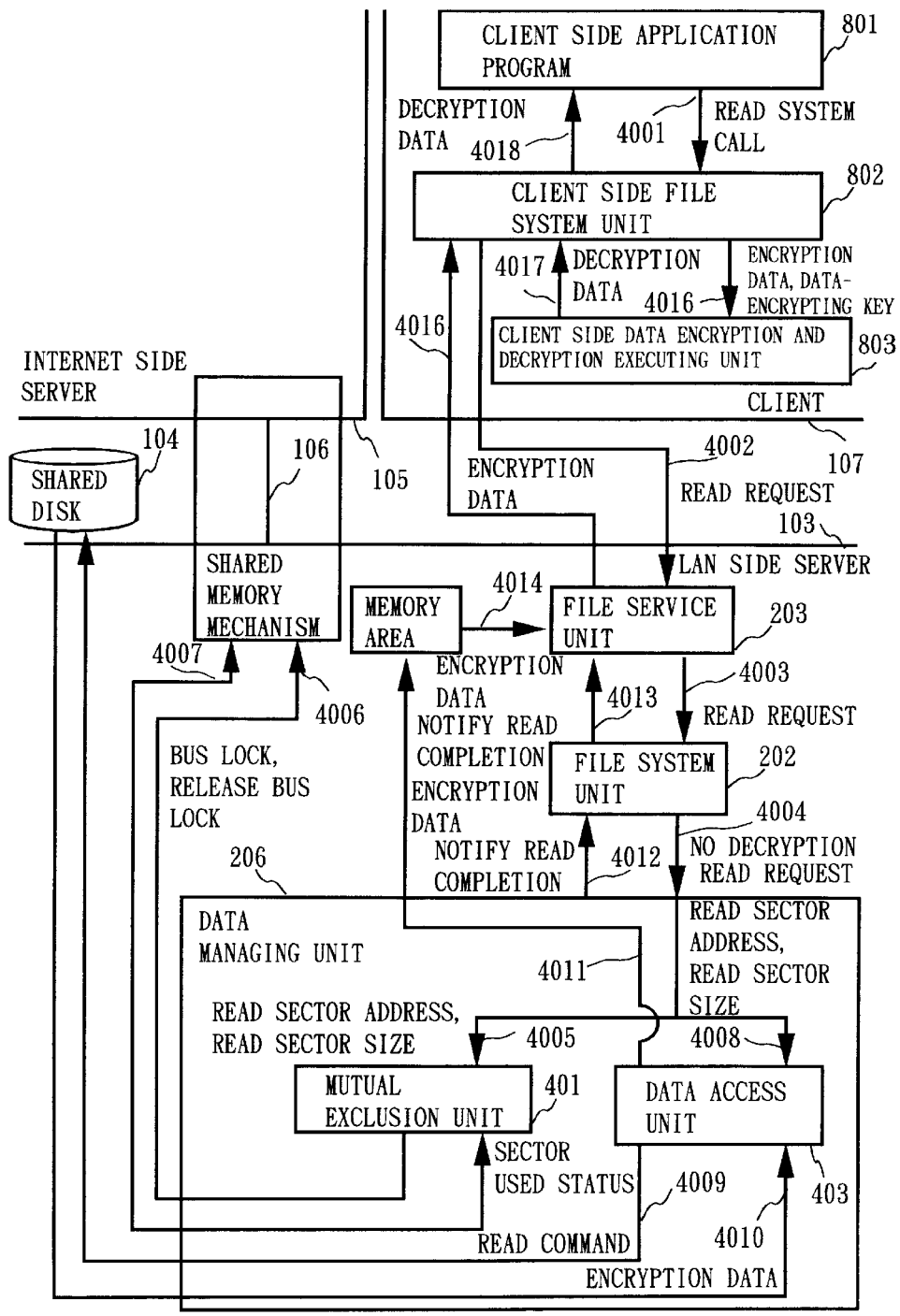
FIG. 40 illustrates a data flow of read process of embodiment 4.

The drawing of FIG. 40 illustrates the data flow of read process. The client side file system unit 802 receives a read system call after the file open (refer to 4001) and transmits a read request message to the file service unit 203 (refer to 4002). The file service unit 203 outputs the read request to the file system unit 202 (refer to 4003). The file system unit 202 issues a no decryption read request to the data managing unit 206 since the vnode is set to "encryption and decryption not needed" (refer to 4004). A process of the no decryption read request in the data managing unit 206 operates in exactly a same manner as the read process described in the embodiment 1, except that a decryption process is not performed for the current read process. Accordingly, an encrypted data is returned to the client 107 in a same manner as the return message of embodiment 1 (refer to 4016).

In the client side, when a returned encryption data is received, the client side file system unit 802 instructs the data encryption and decryption executing unit 803 to execute decryption by using a configured data-encrypting key (refer to 4016). The client side file system unit 802 completes the read process by returning a decrypted data to a client side application program unit 801 (refer to 4018).

Figure 41:
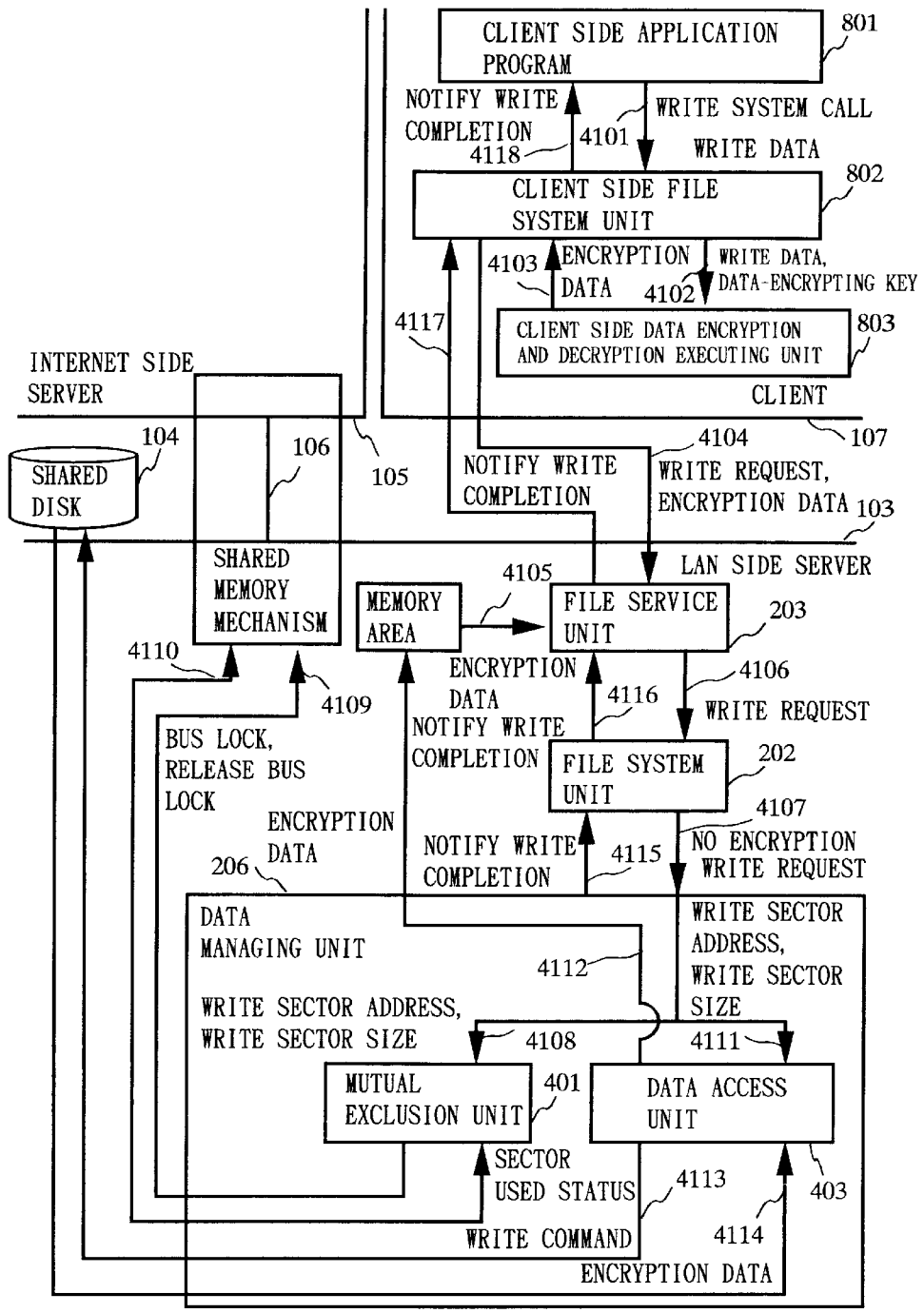
FIG. 41 illustrates a data flow of write process of embodiment 5.

The drawing of FIG. 41 illustrates the data flow of write process. The client side file system unit 802 receives a write system call (refer to 4101) and instructs the data encryption and decryption executing unit 803 to execute encryption of the data which is received by using the cipher key (refer to 4102, 4103). The client side file system unit 802 transmits an encrypted data and a write request message to the file service unit 203 (refer to 4104). The file service unit 203 issues a write request to the file system unit 202 (refer to 4106). The file system unit 202 calls for a no encryption write request to the data managing unit 206 (refer to 4107). A data is written by the data managing unit 206 described in the embodiment 1 as it is, without encrypting the data (refer to 4113, 4114). The file service unit 203 reports an end of the write process to the client 107 (refer to 4117).

Accordingly, by placing the data encryption and decryption functions to the client, a secrecy and safety factors of the data are improved. Particularly, in cases of wireless communication to the server from the mobile client terminal, the embodiment 4 is advantageous in keeping the secrecy and safety factors of the data.

Embodiment 5

In this embodiment, for cases of using the replication service from a remote location via the internet, a system for reducing a data transferring latency is described. Specifically, the present embodiment describes an example of installing a proxy server and implementing a data cache function of the file service of the embodiment 1.

Figure 9:
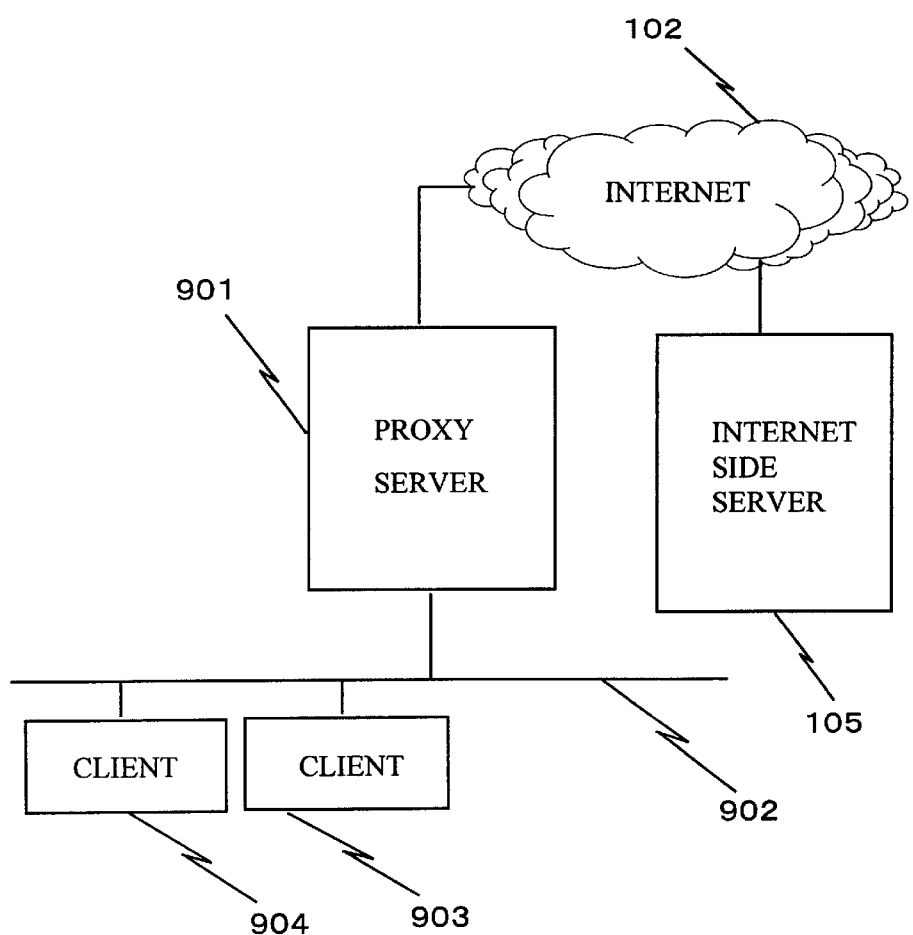
FIG. 9 illustrates a system configuration of embodiment 5.

FIG. 9 illustrates the system configuration of embodiment 5. The system comprises the following elements: an internet side server 105 described in the embodiment 1 (replicating server); a proxy server 901; a LAN 902; and clients 903 and 904. The clients 903 and 904 receives the service supplied from the internet side server 105 via the internet 102.

Looking from the clients 903 and 904, a file service supplied by the proxy server 901 is configured to be exactly same as a file service supplied in case of directly connecting to the file service unit 203 of the internet side server 105.

This means that the proxy server 901 supplies a port number to the clients 903 and 904 that is identical to a port number of the known UDP port supplied by the file service unit 203 of the internet side server 105.

The basic operation of this configuration is described next.

Figure 42:
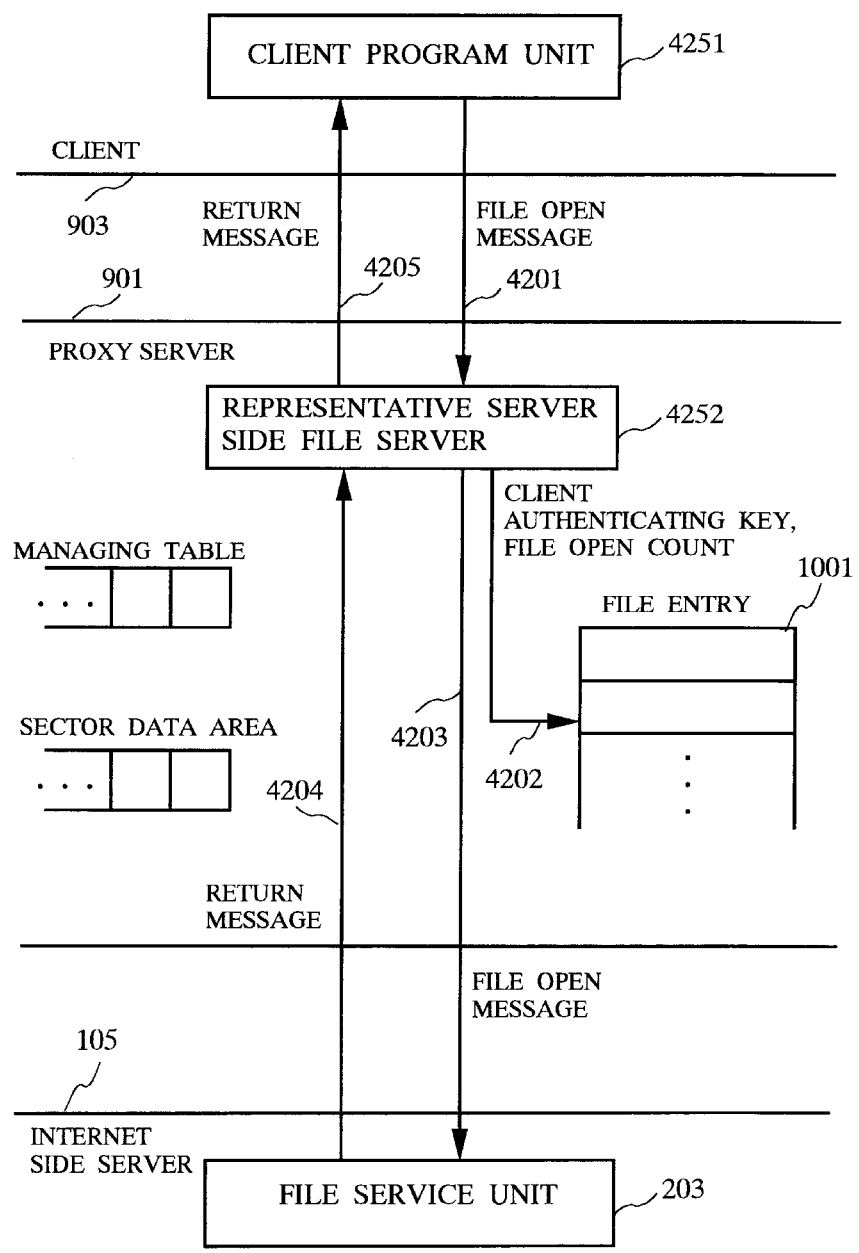
FIG. 42 illustrates a data flow of open process of embodiment 5.

An open process is described first. The drawing of FIG. 42 illustrates the data flow of open process, comprising: a client program unit 4251 and a proxy server side file service unit 4252.

The client program unit 4251 transmits a file open message to the previously described known port of the proxy server 901 (refer to 4201). The proxy server side file service unit 4252 receives the file open message and prepares an inner data (including file entry, sector managing table and sector data area).

Figure 10:
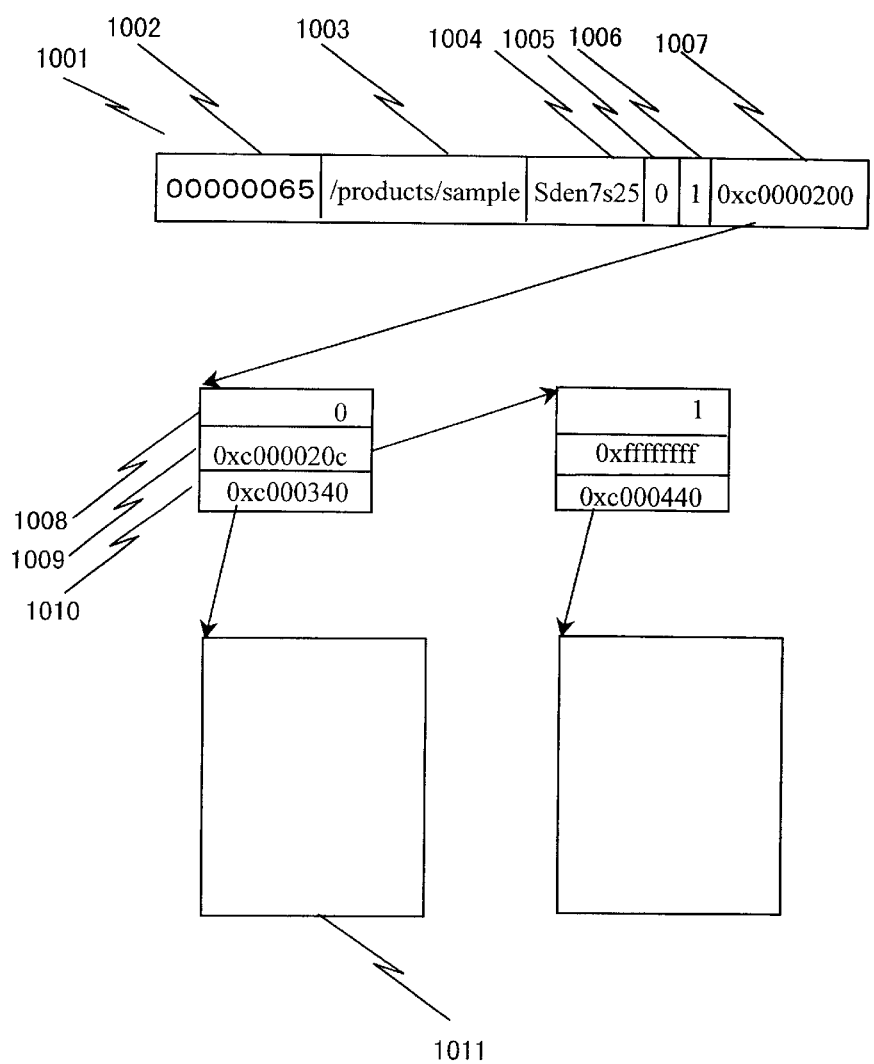
FIG. 10 illustrates an inner data configuration of embodiment 5.

The drawing of FIG. 10 illustrates the configuration of inner data (including file entry, sector managing table and sector data area), comprising: a file entry 1001; a user ID field 1002; a file name field 1003; a client authenticating key field 1004; a file open attribute field 1005; an open count field 1006 of file; a pointer field 1007 to the managing table of a first sector; a sector number 1008 of file; a pointer 1009 to the next managing table; a pointer 1010 to a sector data area; and the sector data area 1011.

The proxy server side file service unit 4252 stores a user ID and an opening file name in the file open message to the user ID field 1002 and the file name field 1003, respectively (refer to 4202). Also, a file open attribute is stored to the file open attribute field 1005 (refer to 4202). The file open attribute includes an attribute of "encryption and decryption needed" or "encryption and decryption not needed" as described in the embodiment 4.

The file open message is transmitted to the file service unit 203 of the internet side server 105 as it is (refer to 4203). The proxy server side file service unit 4252 stores a client authenticating key to the client authenticating key field 1004 (refer to 4202). The client authenticating key is in a return message from the file service unit 203. Also, an open count of the present file is stored in the open count field 1006 (refer to 4202).

Figure 43:
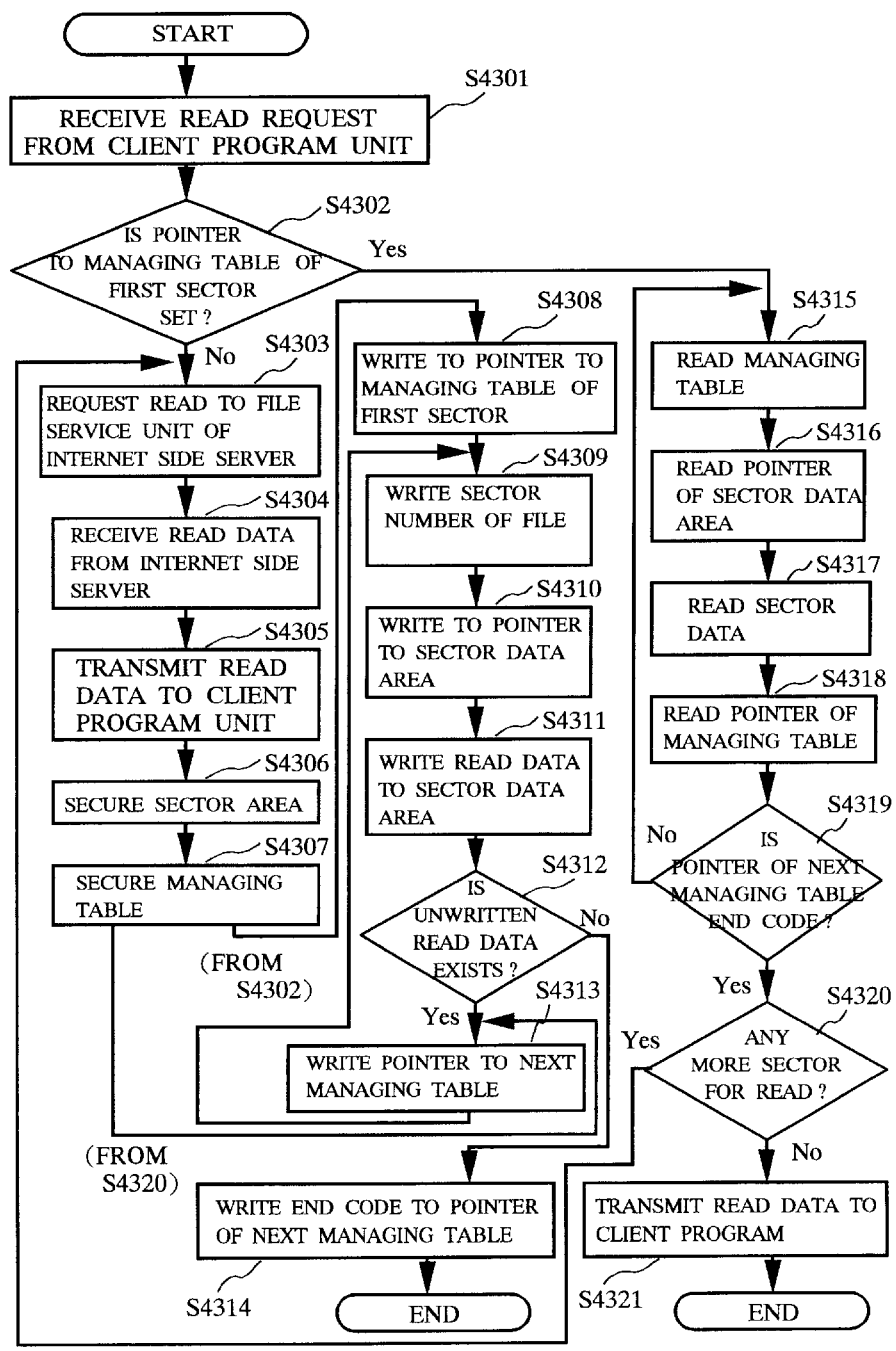
FIG. 43 illustrates a process flow of read process of embodiment 5.
Figure 44:
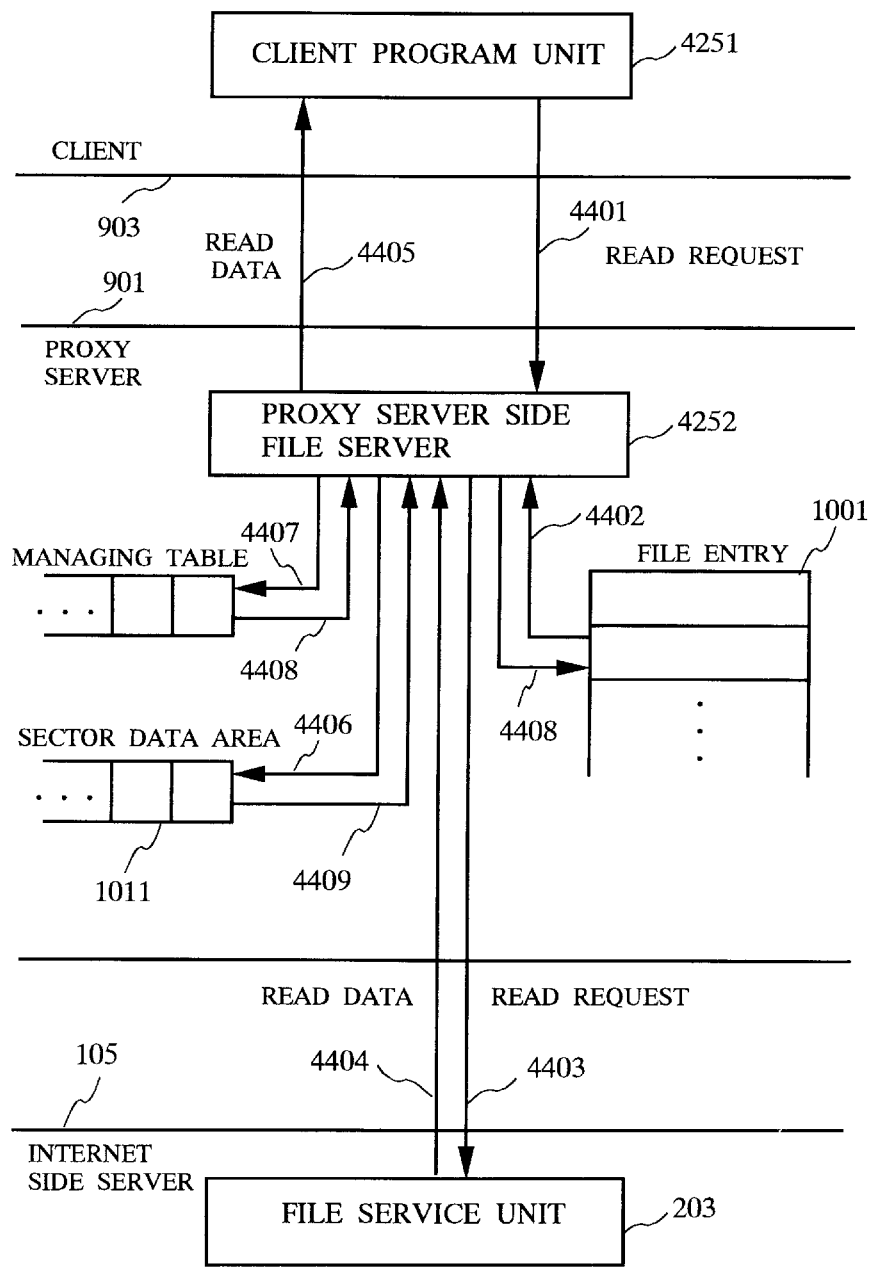
FIG. 44 illustrates a data flow of the read process of embodiment 5.

A read process is described next. FIG. 43 illustrates the process flow of read process. FIG. 44 illustrates the data flow of read process.

The proxy server side service unit 4252 receives a read request message from the client program unit 4251 (refer to S4301, 4401), and checks the pointer field 1007 to the managing table of the first sector (refer to S4302, 4402). When 0Xffffffff is stored in this field (meaning that the pointer is not set to the managing table of the first sector), then this file has not executed the read process, so a message from the client program unit 4251 is transferred to the file service unit 203 of the internet side server 105 (refer to S4303, 4403).

The proxy server side service unit 4252 obtains a read data (refer to S4304, 4404) and transfers a return message to the client program unit 4251 (refer to S4305, 4405).

The proxy server side service unit 4252 secures a required sector data area 1011 and its corresponding sector managing tables 1008, 1009 and 1010 as illustrated in FIG. 10 (refer to S4306, S4307, 4406 and 4407). A pointer to the managing table of the first sector is stored in the pointer field 1007 to the managing table of the first sector (refer to S4308, 4408). A sector number of the file is stored to the corresponding sector number field 1008 of the file (refer to S4309, 4407).

A pointer to the sector data area is stored in the pointer field 1010 to the sector data area (refer to S4310, 4407). The read data obtained from the return message is stored to the sector data area 1011 (refer to S4311, 4406).

In cases of requiring more than two of the sector data areas (refer to S4312), a pointer to the next managing table is stored to the pointer field 1009 to the next managing table (refer to S4313, 4407). By doing so, the managing tables are linked, and for the last one of the managing table (refer to S4312), store 0xffffffff to the pointer field 1009 to the next managing table (refer to S4314, 4407).

After this, if the read request to the proxy server for this file occurs, and if a corresponding sector already exists at the cache illustrated in FIG. 10 in step S4302, the data is used as it is in steps S4315 to S4319. If the sector does not exist in step S4320, requests an insufficient amount of sector data to the file service unit 203 of the internet side server 105 in step S4303, and insert the insufficient amount of sector data to a link of the pre-existing sector data in steps S4313, S4309 to S4312. When all the sectors in the read request are complete, create a read request return message which is exactly same as the one created by the file service unit 203, and return it to the client program unit (refer to 4205 and 4405).

Figure 45:
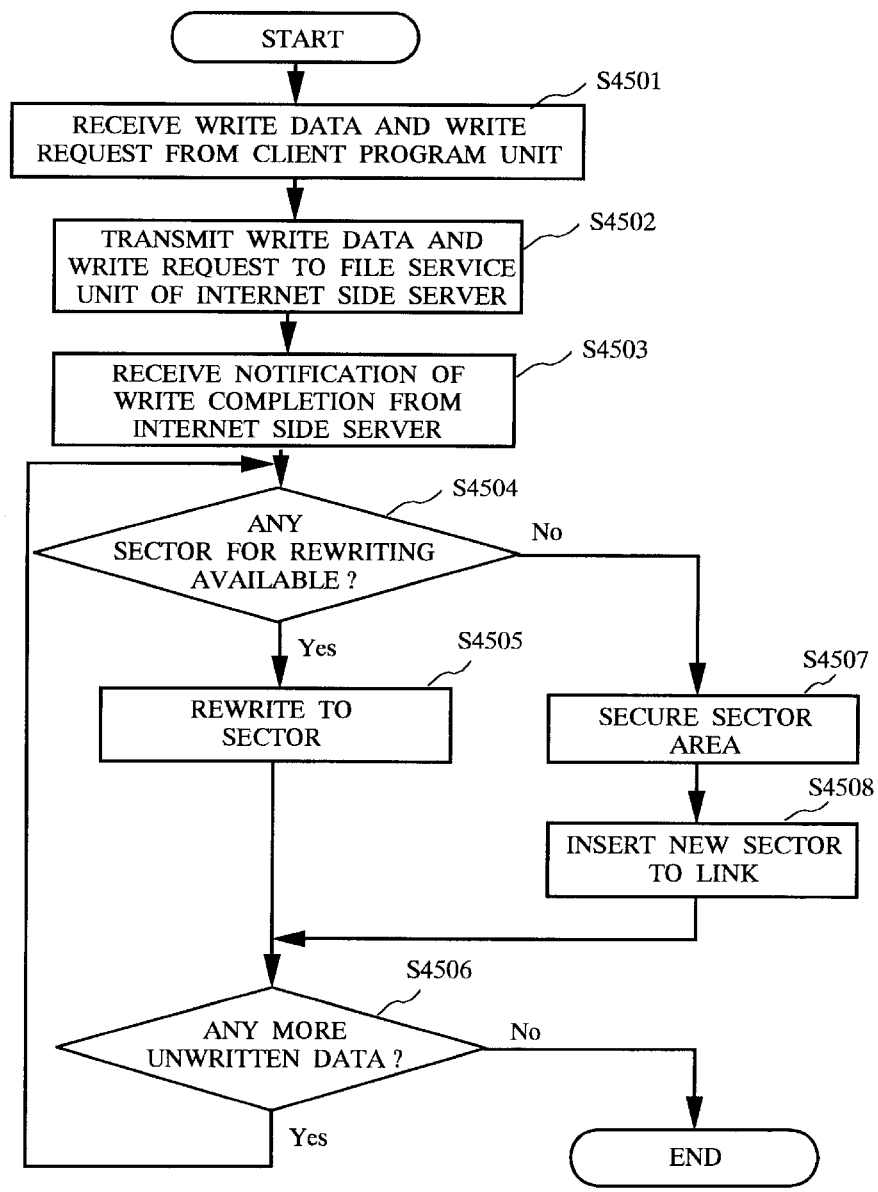
FIG. 45 illustrates a process flow of write process of embodiment 5.
Figure 46:
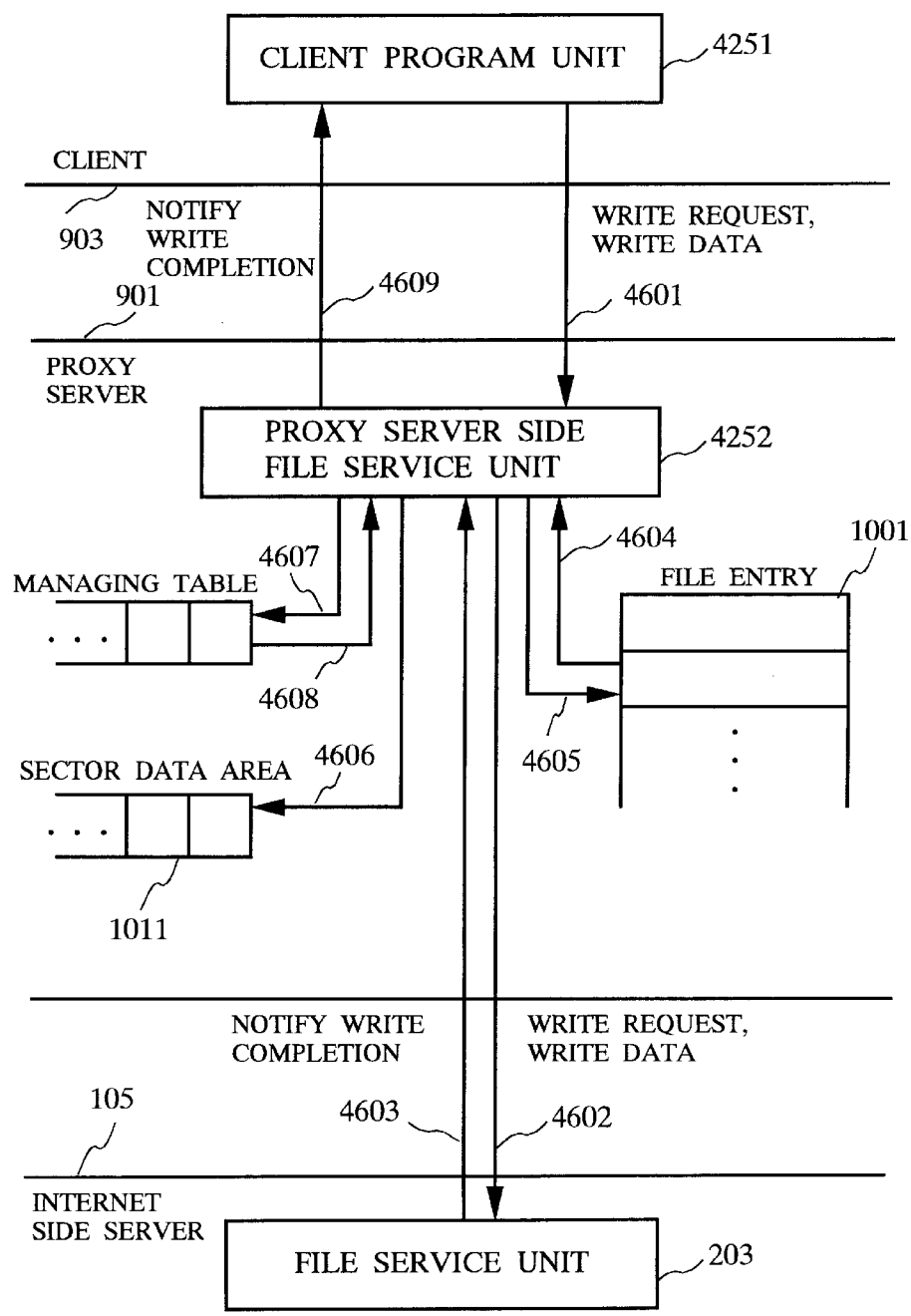
FIG. 46 illustrates a data flow of the write process of embodiment 5.

A write process is described next. FIG. 45 illustrates the flow process of write process. FIG. 46 illustrates the data flow of write process.

When the proxy server side file service unit 4252 receives a write request message from the client program unit 4251 (refer to S4501, 4601), the proxy server side file service unit 4252 transfers this message to the file service unit 203 of the internet side server 105 (refer to S4502, 4602). If all sector data for writing are already stored in the file entry 1001 of this file (refer to S4504, 4604), write over the sector data in the write request message from the client program unit 4251 to the stored sector data (refer to S4505, 4605) and if the sector data area is not secured for these sectors, then secure a new sector data area (refer to S4507, 4606, 4607), and these sectors are inserted to their links (refer to S4508, 4607, 4608).

Figure 47:
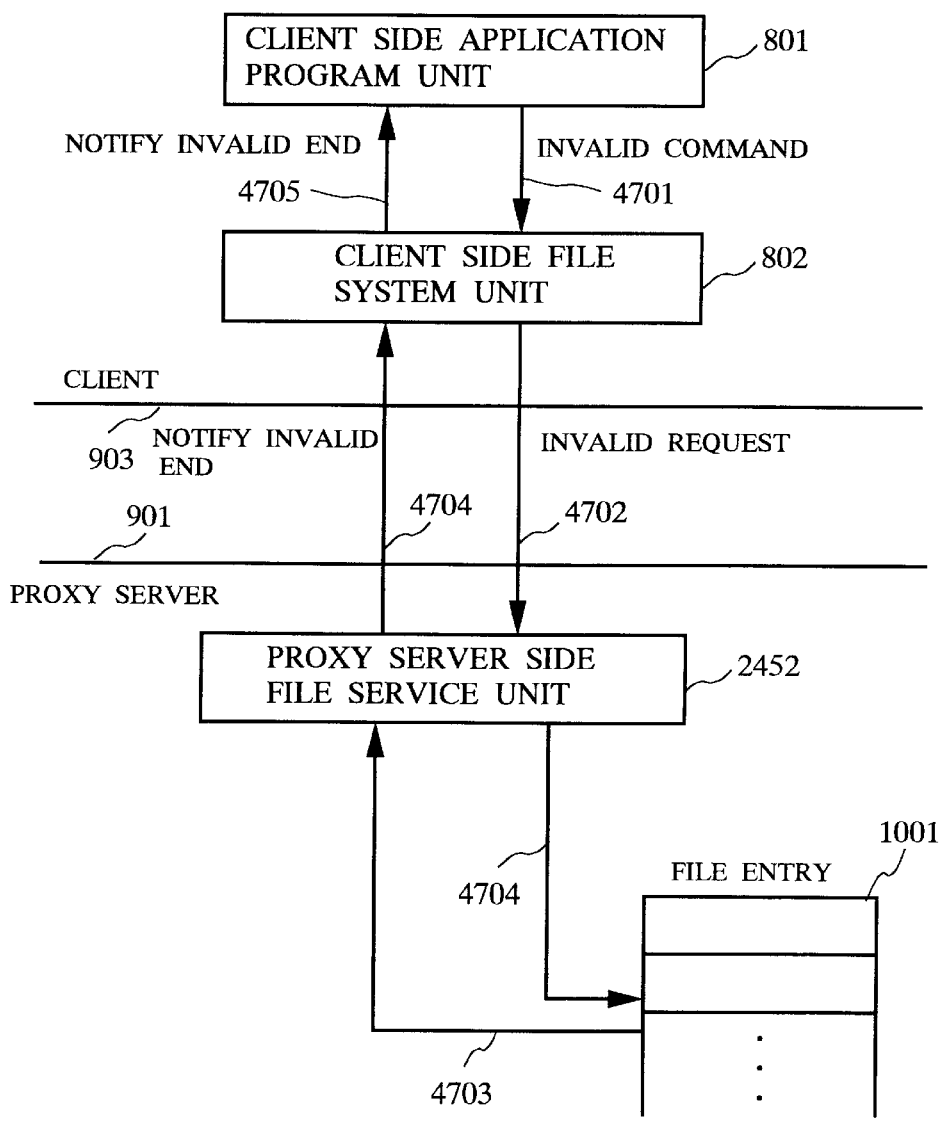
FIG. 47 illustrates a data flow of file invalid process of embodiment 5.

An invalid process of the file is described next. FIG. 47 illustrates the data flow of file invalid process.

When a certain file is being cached by the proxy server 901, and if the file contents corresponding to the shared disk 104 is updated by the LAN side server 103, the file data of proxy server 901 and the file data corresponding to the shared disk 104 are no longer consistent. It is up to the clients 903 and 904 to control the maintenance of consistency of the file data. Because of this, the client side application unit 801 issues an invalid command of "fcntl" system call by specifying a file to be made invalid to the client side file system unit 802 in case of wanting to make the file data being cached on the proxy server 901 invalid (refer to 4701).

Figures 48, 49:
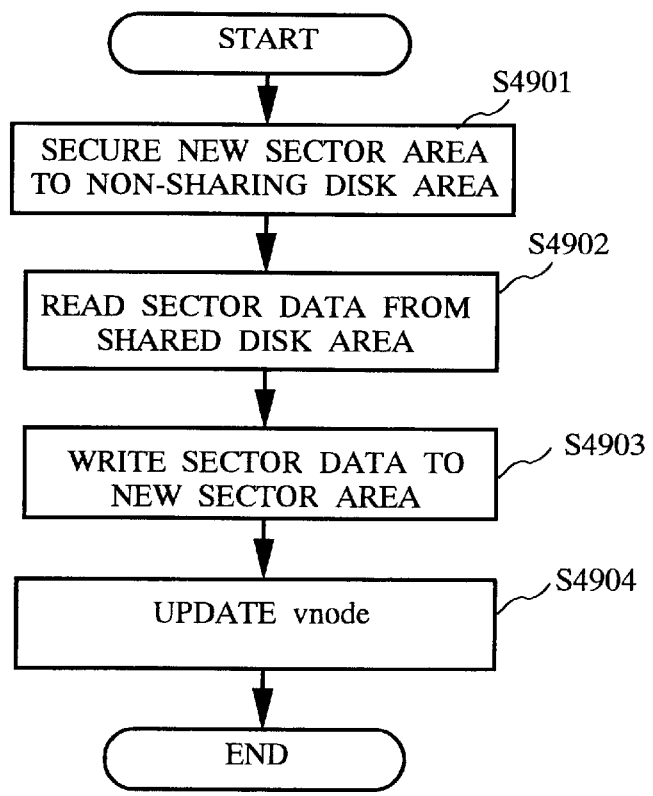
FIG. 48 illustrates an example of invalid request message embodiment 5.
FIG. 49 illustrates a process flow of Localize command process of embodiment 6.

The client side file system unit 802 interprets the invalid command, and outputs an invalid request to the proxy server 901 (refer to 4702). FIG. 48 illustrates the example of invalid request message.

The proxy server side file service unit 4252 receives the invalid request message, searches the file entries managed by it (refer to 4703), initializes the file open attribute 1005 of a file entry of the file to be made invalid by 0Xffffffff, and makes a cache data invalid (refer to 4704). Due to this, when the read request is made to this file again, then the file data is to be re-obtained from the file service 203 of the internet side server 105.

A problem of the data transferring latency increases as a distance of the internet connection gets larger. For example, it takes 0.2 seconds for a data to arrive to East Coast of USA from Japan. The present invention is effective in reducing such latency.

Embodiment 6

Accordingly, by adopting the present invention as described above, the present invention can supply the file service common to a plurality of networks. By using a shared file between the networks supplied by such file service, a server service operating based on a data of the file can be supplied without adding any modification to the conventional server program.

For example, when the IMAP4 (internet message access protocol 4) mail service is replicated, this server function receives a mail data at the intranet by SMTP, and stores the mail data to the shared disk as a data managed by the server. Since a stored mail data is managed by the shared disk, the IMAP4 service can be supplied at the intranet and internet based on this mail data. Due to this, a user of IMAP4 mail service can process a mail arrived to the user's mail account of the intranet from the intranet (for example, inside an office) or from the internet (for example, outside the office).

Although the IMAP4 mail servers executed at networks uses the same server program, with regard to a set up of IMAP4 server, as opposed to a need of taking a mail at the intranet side, there is no need to take the mail at the internet side. That is, for a part of setup file, a need arises for setting the IMAP4 server independently for each network, and therefore, the setup file must be installed separately for each network.

Therefore, in the present embodiment, a file localize mechanism required for such independent settings is described. A manager of server gives the following command required for localizing.
Localize Afile Specifically, after the setup file is opened, the command above is issued by a "fcntl" system call by specifying the setup file.

FIG. 49 illustrates the process flow of Localize command process.

The file system unit 202 secures a new sector area to an non-sharing disk area managed by the file system unit 202 in step S4901, and reads a sector data of the setup file from the data managing unit 206 in step S4902, and writes the sector data read to a secured new sector area in step S4903. A file data is copied to the non-sharing area accordingly. The file system unit 202 localizes a file of shared area by updating a vnode of the setup file so that an inode which manages the secured new sector is referred in step S4904.

Accordingly, it becomes possible to independently update and manage a configuration information of the service for each network.

Embodiment 7

In the present embodiment, with regard to the service replicating server of the present invention, an authenticating mechanism strength required in the network for each sub-network included in the server is described. A strength of authenticating mechanism is configured to respond to needs.

For example, the intranet is generally strictly protected from outside networks in order to maintain the safety factor, so that there is no need for authenticating strength inside the intranet to a great extent. On the other hand, the internet is frequently subjected to a threat from outside, and therefore, it requires a high authenticating strength.

Figure 11:
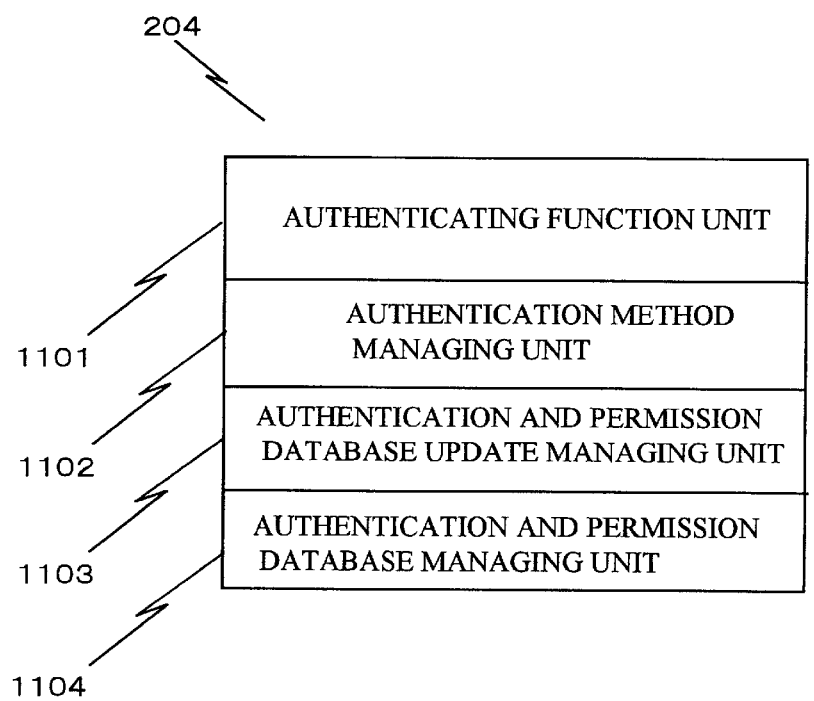
FIG. 11 illustrates a configuration of user authentication and permission managing unit of embodiment 7.

The drawing of FIG. 11 illustrates the configuration of user authentication and permission managing unit 204 of the present embodiment, comprising: an authenticating function unit 1101; an authentication method managing unit 1102; an authentication and permission database update managing unit 1103; and an authentication and permission database managing unit 1104. Under this configuration, the user authentication and permission managing unit 204 configures authentication function having the required authenticating strength by each sub-network.

The authenticating function unit 1101 receives an authenticating request from the user and performs authentication. At this time, the authenticating function unit 1101 follows the authentication method managed by the authentication method managing unit 1102, and performs the authentication by obtaining and referring to an authenticating data from the authentication and permission database managing unit 1104.

A system manager can install an authentication function suitable for the authenticating strength required by a sub-network to the authentication method managing unit 1102. For example, for the intranet, an authentication function having the hash function such as MD5 (message digest algorithm 5) which is commonly used in UNIX can be installed. For the internet, an authentication function using one time password can be installed.

Each authentication function obtains data to be authenticated and examined from the authenticating function unit 1101, obtains the authenticating data from the authentication and permission database managing unit 1104, and are provided with an interface for authenticating. Also, each authentication function is configured to use a common authenticating data.

The authentication and permission database is shared between each network. Accordingly, the system manager for managing the user of the system only needs to update the authentication and permission database update managing unit 1103 of any one of the sub-networks, and a content of the updating is automatically reflected to the authenticating functions of all the networks.

According to the present invention, for example, among the networks such as interoffice network system and the internet, able to safely share a data and use the service by replicating them for each network.

According to the present invention, a system which is partitioned off for every networks is implemented for the shared memory type parallel computer, so that a safety of the system can be improved by removing an intrusion by a network into another network.

According to the present invention, a data secrecy can be improved by the re-encrypting mechanism in preparation to the cases of permitting an unauthorized login by the third party.

According to the present invention, the secrecy and safety factors of data are improved by the client encrypting and decrypting the data. Particularly, in cases of communicating with the server by wireless communication from a mobile client terminal, the present invention is advantageous in maintaining the secrecy and safety of the data.

The present invention can reduce the data transferring latency which increases as the distance between an internet connection gets large.

The present invention can independently update and manage the configuration information of the service for each network.

The present invention can use the authentication mechanism having a strength needed by each sub-network.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data sharing computer system, comprising: a first computer system; a second computer system; a shared data storing unit operably connected to the first and second computer systems; and an access control information storing unit; wherein (A) the shared data storing device includes a plurality of data storing areas, which divides a shared data accessed by the first computer system and the second computer system, and stores the divided shared data to the plurality of data storing areas;

(B) the access control information storing device stores an access control information which indicates whether each data storing area of the shared data storing device is accessible or not accessible;

(C) the first computer system includes a first service unit, a first data access unit operably connected to the shared data storing device, and a first mutual exclusion unit operably connected to the access control information storing unit; wherein (1) in response to the first service unit instructing the first data access unit and the first mutual exclusion unit to access an arbitrary data storing area, the first mutual exclusion unit obtains the access control information of the instructed data storing area, decides whether the instructed data storing area is accessible or not accessible, and changes the access control information associated with the instructed data storing area to not accessible if decided as accessible;

(2) the first data access unit accesses the instructed data storing area after the first mutual exclusion unit decides that the instructed data storing area is accessible and before the first mutual exclusion unit changes the access control information to not accessible; and (3) the first mutual exclusion unit changes the access control information of the instructed data storing area to accessible after the first data access unit accesses the instructed data storing area;

(D) the second computer system includes a second service unit, a second data access unit operably connected to the shared data storing device, and a second mutual exclusion unit operably connected to the access control information storing unit; wherein (4) in response to the second service unit instructing the second data access unit and the second mutual exclusion unit to access an arbitrary data storing area the second mutual exclusion unit obtains the access control information of the instructed data storing area, decides whether the instructed data storing area is accessible or not accessible, and changes the access control information associated with the instructed data storing area to not accessible if decided as accessible;

(5) the second data access unit accesses the instructed data storing area after the second mutual exclusion unit decides that the instructed data storing area is accessible and before the second mutual exclusion unit changes the access control information to not accessible; and (6) the second mutual exclusion unit changes the access control information of the instructed data storing area to accessible after the second data access unit accesses the instructed data storing area.

2. The data sharing computer system according to claim 1, wherein the first computer system is connected to a first network system having a third computer system;

wherein the first service unit supplies a first service to the third computer system via the first network system;

wherein the second computer system is connected to a second network system having a fourth computer system; and wherein the second computer system is connected to a second network system having a fourth computer system; and wherein the second service unit supplies a second service to the fourth computer system via the second network system.

3. The data sharing computer system according to claim 2, wherein the second service unit supplies the second service to the fourth computer system via the second network system which is substantially equivalent to the first service supplied by the first service unit to the third computer system via the first network system.

4. The data sharing computer system according to claim 1, wherein the first mutual exclusion unit is connected to the access control information storing unit by a bus having bus lock function;

wherein the first mutual exclusion unit locks the bus while obtaining the access control information of the instructed data storing area, deciding whether the instructed data storing area is accessible or not accessible, and changing the access control information associated with the instructed data storing area to not accessible if decided as accessible;

wherein the first mutual exclusion unit locks the bus while the access control information of the instructed data storing area is being changed to access possible;

wherein the second mutual exclusion unit is connected to the access control information storing unit by the bus having bus lock function;

wherein the second mutual exclusion unit locks the bus while obtaining the access control information of the instructed data storing area, deciding whether the instructed data storing area is accessible or not accessible, and changing the access control information associated with the instructed data storing area to not accessible if decided as accessible; and wherein the second mutual exclusion unit locks the bus while the access control information of the instructed data storing area is being changed to access possible.

5. The data sharing computer system according to claim 1, wherein the first mutual exclusion unit executes a series of operations which includes obtaining of the access control information associated with the instructed data storing area, deciding whether the instructed data storing area is accessible or not accessible, and changing of the access control information of the instructed data storing area to not accessible if decided as accessible, wherein the series of operation is executed using a single command; and wherein the second mutual exclusion unit executes a series of operation operations which includes obtaining of the access control information of the instructed data storing area, deciding whether the instructed data storing area is accessible or not accessible, and changing of the access control information associated with the instructed data storing area to not accessible if decided as accessible, wherein the series of operation is executed using a single command.

6. The data sharing computer system according to claim 1, wherein the first computer system comprising:

(1) a data-encrypting key storing unit for storing a data-encrypting key used for encrypting and decrypting;

(2) a data encryption and decryption executing unit for encrypting by using a specified data-encrypting key when an encryption is instructed by specifying the data-encrypting key, and for decrypting by using a specified cipher key when a decryption is instructed by specifying the data-encrypting key;

(3) a data-encrypting key re-setting unit for changing the data-encrypting key stored in the data-encrypting key storing unit; and (4) a data re-encrypting unit for instructing the first data access unit to read an encrypted data from the data storing area, for instructing the data encryption and decryption executing unit to decrypt the encrypted data read from the data storing area by specifying the data-encrypting key before changing the data-encrypting key, for instructing the data encryption and decryption executing unit to re-encrypt the decrypted data by specifying a new data-encrypting key after changing the data-encrypting key, and for instructing the first data access unit to write a re-encrypted data to the data storing area.

7. The data sharing computer system according to claim 1 further comprising a third computer system, wherein the third computer system and the first computer system are connected to a first network system;

wherein the first service unit supplies a service to the third computer system via the first network system; and wherein the third computer system includes a shared data cache unit for caching the shared data accessed by the service supplied by the first service unit.

8. The data sharing computer system according to claim 1, wherein the first service unit operates using a configuration information;

wherein the shared data storing device stores the configuration information used by the first service unit;

wherein the second computer system includes another storing unit;

wherein the second computer system includes a configuration information replicating unit for reading the configuration information stored in the shared data storing device, and for writing the configuration information read to the another storing unit; and wherein the second service unit updates the configuration information written to the another storing unit, and operates by using the updated configuration information.

9. The data sharing computer system according to claim 1, wherein the computer system comprises:

(1) an authentication method managing unit for storing an authentication method used in a user authentication by the first computer system;

(2) an authentication and permission database managing unit for previously storing a data used for the user authentication; and (3) an authenticating function unit for receiving a data requiring the user authentication and an authentication request, and for authenticating by using the previously stored data used for the user authentication in the authentication and permission database managing unit and the data requiring the user authentication, based on the authentication method stored in the authentication method managing unit.

10. The data sharing computer system according to claim 1, wherein the data sharing computer system is a shared memory type parallel computer comprising a bus; and wherein the shared memory type parallel computer includes the first computer system; the second computer system; the shared data storing device; and the access control information storing unit connected via the bus.

11. A method of replicating service in a computer system having a first server and a second server both of which are operably connected to a shared memory via a bus, the method comprising:

dividing the shared memory into a plurality of data storing areas;

storing access control information indicating whether associated data storing areas are accessible or not accessible;

in response to a data access request from the first server requesting data access to a first one of the data storing areas, determining whether the stored access control information indicates whether the first data storing area is accessible;

mutually excluding the second server by changing the access control information associated with the first data storing area to indicate not accessible by the second server;

accessing the first data storing area with the first server;

after said accessing is complete, changing the access control information associated with the first data storing area to indicate accessible.

12. The method according to claim 11, wherein the first server is connected to a first network system having a third computer system, and wherein the second server is connected to a second network system having a fourth computer system; the method further comprising:

supplying a first service to the third computer system via the first network system; and supplying a second service to the fourth computer system via the second network system.

13. The method according to claim 11, wherein the bus has a bus lock function, the method further comprising:

locking the bus during the data access request from the first server and while deciding whether the first data storing area is accessible or not accessible and, if said deciding step decides that the first data storing area is accessible, while changing the access control information to not accessible; and also locking the bus while said changing step changes the access control information associated with the first data storing area to accessible.

14. The method according to claim 11, further comprising:

in response to a data access request from the second server requesting data access to a second one of the data storing areas, determining whether the stored access control information indicates whether the second data storing area is accessible;

mutually excluding the first server by changing the access control information associated with the second data storing area to indicate not accessible by the first server;

accessing the second data storing area with the second server;

after said accessing is complete, changing the access control information associated with the second data storing area to indicate accessible.

15. The method according to claim 14, wherein the bus has a bus lock function, the method further comprising:

locking the bus during the data access request from the second server and while deciding whether the second data storing area is accessible or not accessible and, if said deciding step decides that the second data storing area is accessible, while changing the access control information to not accessible; and also locking the bus while said changing step changes the access control information associated with the second data storing area to accessible.

* * * * *